(12) United States Patent  
Cai

(10) Patent No.: US 10,274,136 B2
(45) Date of Patent: Apr. 30, 2019

(54) COMMUNICATIONS DEVICE

(71) Applicant: XIN YU CONNECT PTE LTD, Singapore (SG)

(72) Inventor: Zhen Cai, Singapore (SG)

(73) Assignee: Xin Yu Connect PTE LTD, Singapore (SG)

( * ) Notice: Subject to any disclaimer, the term of this patent is extended or adjusted under 35 U.S.C. 154(b) by 30 days.

(21) Appl. No.: 15/540,715

(22) PCT Filed: Feb. 12, 2016

(86) PCT No.: PCT/SG2016/050071
§ 371 (c)(1),
(2) Date: Jun. 29, 2017

(87) PCT Pub. No.: WO2016/130089
PCT Pub. Date: Aug. 18, 2016

(65) Prior Publication Data
US 2017/0370531 A1 Dec. 28, 2017

(30) Foreign Application Priority Data

Feb. 13, 2015 (SG) .............................. 10201501166S

(51) Int. Cl.
*F21K 9/238* (2016.01)
*F21K 9/278* (2016.01)
(Continued)

(52) U.S. Cl.
CPC .............. *F21K 9/238* (2016.08); *F21K 9/278* (2016.08); *H04B 3/542* (2013.01);
(Continued)

(58) Field of Classification Search
CPC ........... F21K 9/238; F21K 9/278; H04B 3/54; H04B 3/56; H04B 3/58; H04B 3/542; H04Q 9/00; H04Q 9/02
(Continued)

(56) References Cited

U.S. PATENT DOCUMENTS

2003/0006883 A1\* 1/2003 Kim .......................... H04B 3/54
714/776
2003/0090368 A1\* 5/2003 Ide ........................... H04B 3/54
370/276
(Continued)

FOREIGN PATENT DOCUMENTS

AU 2010235891 5/2011
CN 101616523 12/2009
WO 2010/080565 7/2010

*Primary Examiner* — Fritz M Fleming
*Assistant Examiner* — Jagdeep S Dhillon
(74) *Attorney, Agent, or Firm* — Keith Swedo

(57) ABSTRACT

A communications device for forming a network node between two or more devices or systems. The communications device has a power supply connector for connecting to a power supply in a light socket of a lighting system thereby to power the communications device. The communications device depends from the light socket by the power supply connector. The communications device also includes a receiver for receiving incoming information from one or more first devices or systems, and a transmitter for transmitting outgoing information to one or more second devices or systems.

15 Claims, 32 Drawing Sheets

(51) Int. Cl.
*H04B 3/54* (2006.01)
*H02J 1/00* (2006.01)
*H02J 3/00* (2006.01)
*H05B 37/02* (2006.01)
*H04N 5/232* (2006.01)
*H04N 5/235* (2006.01)
*H04N 7/04* (2006.01)
*H04N 7/10* (2006.01)
*H04Q 9/00* (2006.01)
*F21Y 115/10* (2016.01)
*H05B 33/08* (2006.01)

(52) U.S. Cl.
CPC ......... *H04N 5/2351* (2013.01); *H04N 5/2354* (2013.01); *H04N 5/23206* (2013.01); *H04N 7/04* (2013.01); *H04N 7/108* (2013.01); *H04Q 9/00* (2013.01); *H05B 37/0263* (2013.01); *H05B 37/0272* (2013.01); *F21Y 2115/10* (2016.08); *H04B 3/54* (2013.01); *H04Q 2209/40* (2013.01); *H05B 33/0845* (2013.01)

(58) Field of Classification Search
USPC .......................... 307/1, 9.1, 10.1, 80, 66, 64
See application file for complete search history.

(56) References Cited

U.S. PATENT DOCUMENTS

| | | | |
|---|---|---|---|
| 2003/0107477 A1* | 6/2003 | Ide | H04B 3/542 370/276 |
| 2008/0170540 A1* | 7/2008 | Fukuda | H04B 3/542 370/328 |
| 2009/0015396 A1* | 1/2009 | Yeh | G08B 25/06 340/538.17 |
| 2011/0249658 A1* | 10/2011 | Wohlert | H04W 4/04 370/338 |
| 2011/0275364 A1* | 11/2011 | Austin | H04L 41/06 455/423 |
| 2013/0201316 A1* | 8/2013 | Binder | H04L 67/12 348/77 |
| 2014/0252958 A1 | 9/2014 | Subotnick et al. | |
| 2014/0285999 A1 | 9/2014 | Luna et al. | |

* cited by examiner

COMMUNICATIONS DEVICE

TECHNICAL FIELD

The present disclosure relates to a communications device acting as an intermediary between devices or systems. More particularly, the present disclosure relates to a communications device for receiving information from one device or system and sending information to another device or system.

BACKGROUND

There exist many devices that serve as a communications device or communications intermediary. A Wi-Fi router and a mobile phone providing a Wi-Fi hotspot are examples of such a device. In each case, the router or mobile phone communicates information between a computer and the Internet.

Communications devices are often limited in the positions in the area over which they can operate, and the time over which they can operate.

A Wi-Fi router needs to be positioned near both a power supply and an Ethernet or Internet cable socket. Thus a building will typically provide Wi-Fi routers at one or more fixed positions, nearby a power outlet and a cable socket. The reliability of the connection of a computer (or other device) to the router(s) is inversely proportional to the distance of the computer from the router(s), and the connection can be obscured by walls and other structural members. To service large areas requires installation of a number of routers. Installation can be very expensive, particularly for established buildings, since wiring needs to be run through wall and roof cavities to form a connection with communications towers by which to access the Internet.

A Wi-Fi hotspot provided by a mobile phone can be moved to the location at which an Internet connection is desired. However, Wi-Fi hotspot connections rapidly deplete the battery of a mobile phone, and data transmission rates can make Internet connection very slow, particularly where multiple users try to connect to a single Wi-Fi hotspot. Moreover, while mobile phone battery life is generally very short when providing Wi-Fi connectivity, to ensure the battery lasts for a sufficient time to make the Wi-Fi hotspot a viable means by which to access the Internet, the range of a Wi-Fi hotspot is typically very small.

It is therefore desirable that there be provided a communications device that can remove one or more of the problems associated with the abovementioned technologies, or at least provide a viable alternative.

SUMMARY

The present disclosure provides a communications device for forming a network node between at least two devices or systems, comprising:
  a power supply connector for connecting between a power source and a lighting circuit thereby to power the communications device, the lighting circuit comprising one or more direct current (DC) light sources;
  a receiver for receiving incoming information from one or more first devices or systems;
  a transmitter for transmitting outgoing information to one or more second devices or systems; and
  a converter for converting power from the power source to DC power for powering the one or more DC light sources.

The power source may be an AC power source.

The converter may be an AC to DC converter.

Each of the one or more DC light sources may comprise a light-emitting diode.

The present disclosure provides a communications device for forming a network node between at least two devices or systems, comprising:
  a power supply connector for connecting to a power supply in a light socket of a lighting system thereby to power the communications device,
  a receiver for receiving incoming information from one or more first devices or systems; and
  a transmitter for transmitting outgoing information to one or more second devices or systems,
  wherein the communications device depends from the light socket by the power supply connector.

The present disclosure also provides a communications device for forming a network node between at least two devices or systems, comprising:
  a power supply connector for connecting to a power supply in a light socket of a lighting system thereby to power the communications device,
  an illumination device for illuminating an area around the communications device.
  a receiver for receiving incoming information from one or more first devices or systems, the incoming information comprising control data for controlling illumination of the illumination device; and
  a transmitter for transmitting outgoing information to one or more second devices or systems.

The outgoing information may relate to the incoming information.

The communications device may further comprising at least one device connector accessible from outside the housing, the at least one device connector being connectable to at least one said second device. The device connector may comprise a seal for sealing around the device connector thereby to isolate an internal volume of the housing from ambient atmosphere. The communications device may comprise a plurality of device connectors.

The communications device may comprise an illumination device. The illumination device may comprise a plurality of light sources. The incoming information may comprise control data for controlling illumination of the illumination device. The control data may comprise lighting control information to control one or more function(s) of the illumination device.

The illumination device may provide at least one of ON/OFF, dim, colour-change, and coordinated lighting functions. An on/off function of the illumination device is controlled by a wall switch located on a power line that supplies power to the power supply connector when the controlling function fails to work.

The transmitter may be adapted to transmit lighting control data to one or more other similar communications devices thereby to implement a coordinated lighting function. The receiver may be configured to receive brightness level information from the light sensor and to control illumination of the illumination device to maintain the brightness level at a desired level. The receiver may be adapted to receive lighting control data from one or more other similar communications devices thereby to implement a coordinated lighting function. The illumination device may comprise multiple light sources. illumination one light source is controllable independently of the illumination of the other light source(s). The communications device may comprise multiple lighting drivers independently controllable to drive lighting functions of the light sources. The or each light source may comprise one or more LEDs.

Where the communications device is connected to one or more second devices, the transmitter may be physically connected with the, or each, second device. Wherein the communications device is connected to one or more first devices, the receiver may be physically connected with the, or each, first device. Physical connection may be established by physical connection with one or more device connectors. The receiver may be wirelessly connected with the, or each, first device. The transmitter may be wirelessly connected with the, or each, second device.

The communications device may also comprise a mobile communication GSM card—e.g. a GSM, CDMA or WCDMA card—and the receiver may be configured to receive information over a mobile phone network. The receiver may be configured to receive information from an information source being at least one of the Internet, a mobile phone, a tablet or a laptop or a network device. The receiver may be configured to receive information from an information source including at least one of a motion sensor, light sensor, gas detector, noise detector, thermal detector, smoke alarm, microphone, audio speaker and camera.

The receiver and transmitter may form a transceiver. The communications device may comprise a plurality of receivers for receiving information from a variety of information sources.

The communications device may further comprise a configurable memory for storing driver information for driving one or more said receiving devices.

The communications device may further comprise a plurality of transmitters for transmitting information to a variety of receiving devices. The communications device may further comprise a configurable memory for storing driver information for driving one or more said receiving devices, the configurable memory being configured by information received through the PLC module.

The communications device may further comprise a radio frequency (RF) module. The communications device may further comprise a configurable memory for storing driver information for driving one or more said receiving devices, the configurable memory being configured by information received through the RF module. The RF module may communicate with one or more radio frequency antennae. The receiver and transmitter may form part of the RF module. The communications device may comprise a plurality of RF modules. Each of the plurality of RF modules may be connected to a respective radio frequency antenna and the receiver and transmitter are formed by the RF modules.

The first device may comprise an SD card.

The incoming information may comprise data, the communications device further comprising a central processing unit for inspecting the data to determine whether the data is at least one of legible, legal and known. The illegal data and illegible data may be stopped. Illegal and illegible data may be stored in a knowledge base. The knowledge base may be stored in memory. The memory may comprise flash storage, memory or an SD card. The knowledge base may be updated from a cloud server.

Power-line communication network pairing or reset operations of the PLC may be performed through a software program stored on a network.

The illumination device may be switched ON or OFF by an external switch.

The communications device may further comprise an interface for interfacing directly with one or more further communications devices thereby to send signals between the communications device and further communications devices. The signals may comprise information for configuring the communications device.

The receiver may be configured to receive streamed video data from the camera and sends that data to a second device over a network. The receiver may be configured to receive streamed video data from the camera takes and store that data in a second device comprising an SD Card physically connected to the communications device. The receiver may be configured to receive digital audio data from a first device and plays that audio data through the speaker. The receiver may be configured to receive an incoming signal from a motion sensor when the motion sensor senses motion and the transmitter is configured to send an outgoing signal to the camera, upon receipt of the incoming signal, to control the camera to commence recording a video feed. The motion sensor may be attached to a device connector. The device connector may be accessible from outside the housing.

Where the communications device comprises a memory, the memory may comprise digital audio data and the speaker takes plays that digital audio data.

The communications device may communicate wirelessly between both the information source and at least one said receiving device. The transmitter may transmit information to the information source.

The communications device may communicate wirelessly between both an information source and at least one said receiving device. The receiver may receive information from the receiving device. The one or more receiving devices may include a removable memory device. The removable memory device may be a Secure Digital (SD) card. The removable memory may be detachably connectable with a socket by which it communicates with the communications device.

The communications device may comprise one or more device connectors, the or each device connector comprising a general purpose input/output device.

Advantageously, where the communications device facilitates AC to DC conversion, it can be used to convert an entire circuit downstream of the communications device (i.e. in a position to receive power from the communications device) to DC. This enables one or more devices, such as LEDs, to be installed in the DC circuit without requiring a respective AC to DC converter in each device.

BRIEF DESCRIPTION OF THE DRAWINGS

Preferred embodiments of the communications device, and associated systems, will now be described, by way of non-limiting example only, with reference to the accompanying drawings in which.

DETAILED DESCRIPTION

Figure 1:
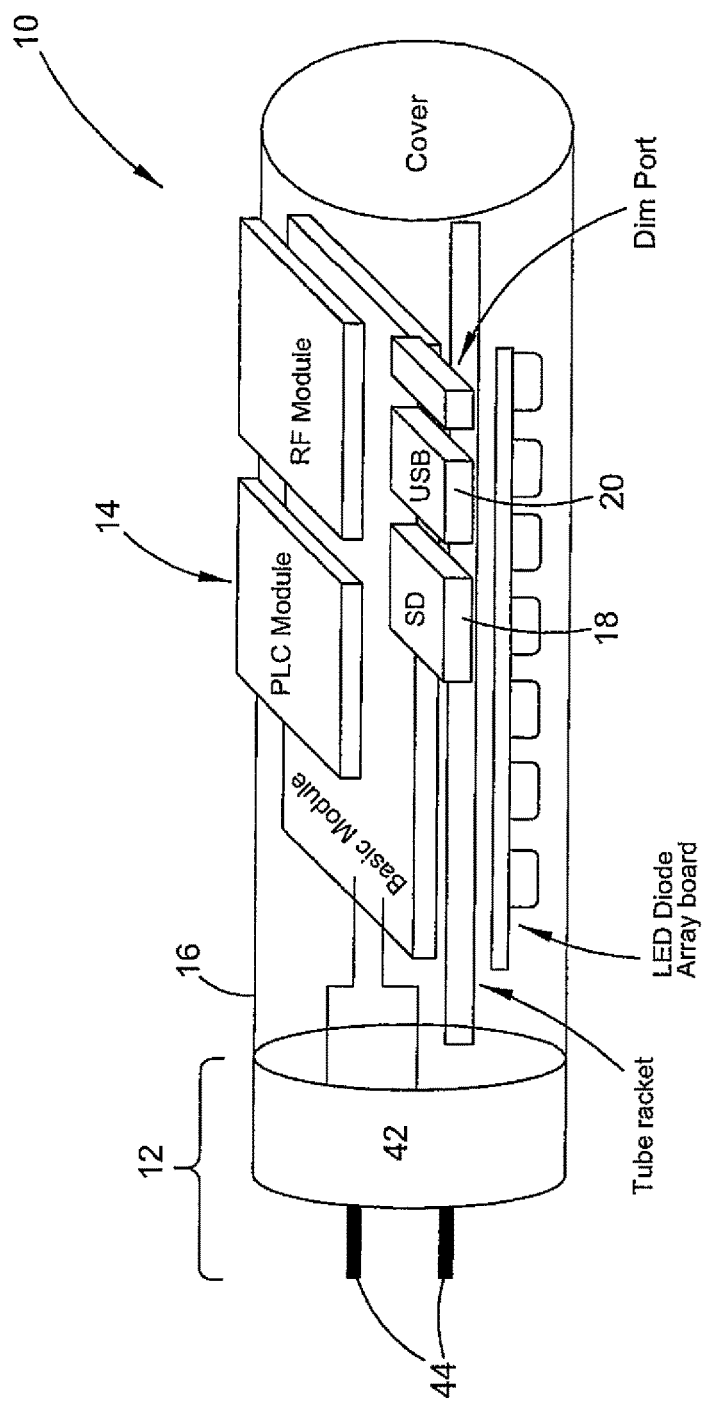
FIG. 1 is a schematic diagram of a communications device in accordance with the present teachings.

A communications device 10, as shown in FIG. 1, is used to receive and transmit information. The communications device 10 has the general shape of a lighting tube and is shaped and sized to fit into a light fitting. Thus installation of the communications device 10 into the light fitting may be as easy as replacing a lighting tube or light bulb in that fitting. In this way the communications device 10 can be easily installed into a light fitting in each room (i.e. without requiring Internet cable sockets) or wherever it is desired, to provide connectivity (e.g. Internet connectivity) for smart devices.

The communications device 10 includes a power supply connector 12 and circuitry 14 providing the functions of a receiver and transmitter. The skilled person will understand that devices capable of receiving and transmitting data, such as the Wi-Fi module 90 and Wi-Fi antenna 96 of FIG. 4, will often be capable of operating as a component of a receiver and at other times as a component of a transmitter. As such, in some embodiments described herein a receiver and distinct (i.e. separate) transmitter will not be identifiable since the transmitter and receiver may share many components. In some such arrangements the communications device may be considered to comprise a transceiver providing the functions of both the receiver and transmitter.

The communications device 10 of FIG. 1 comprises a housing in the form of a lighting tube casing 16. The communications device 10 includes one or more, and presently two, device connectors 100, 102 connectable to one or more first devices or "receiving devices" (i.e. devices that are to receive information from the transmitter). Each device connector may comprise any desired type of connection, such as a general purpose input/output (GPIO), plug, socket (e.g. USB socket or other cable socket) or slot, necessary to afford attachment of other types of devices. The device connectors in the present embodiment are an SD card slot 18 and a USB socket 20, accessible from outside the housing 16. Devices such as an external SD card, USB camera, lighting module (i.e. external illumination device), USB storage device, speaker, USB communication device etc. (collectively "connected devices") may be connected in the requisite slot. Each device may include its own drivers by which to update the firmware on the communications device, and may be provided a unique ID (e.g. MAC address and IP address) on the communications device. The connected devices can communicate through the communications device, and can similarly provide connected device status information to monitor proper operation of the connected devices.

The power supply connector 12 connects to a power supply in a light socket of a lighting system (not shown) thereby to power the communications device 10. The power supply connector 12 comprises an end cap 42 and contacts 44 extending from the end cap 42 in the same way as contacts would extend from the end cap of a standard lighting tube. Thus the communications device 10 is designed to fit within a standard light fitting, and to be powered by a power supply that would otherwise be used to power a standard lighting tube. Accordingly, the process of installing the communications device 10 is the same process as would be used for changing a lighting tube. The end cap 42 can be placed at both ends of the communications device (see numerals 125, 125' in FIG. 6).

Figure 2:
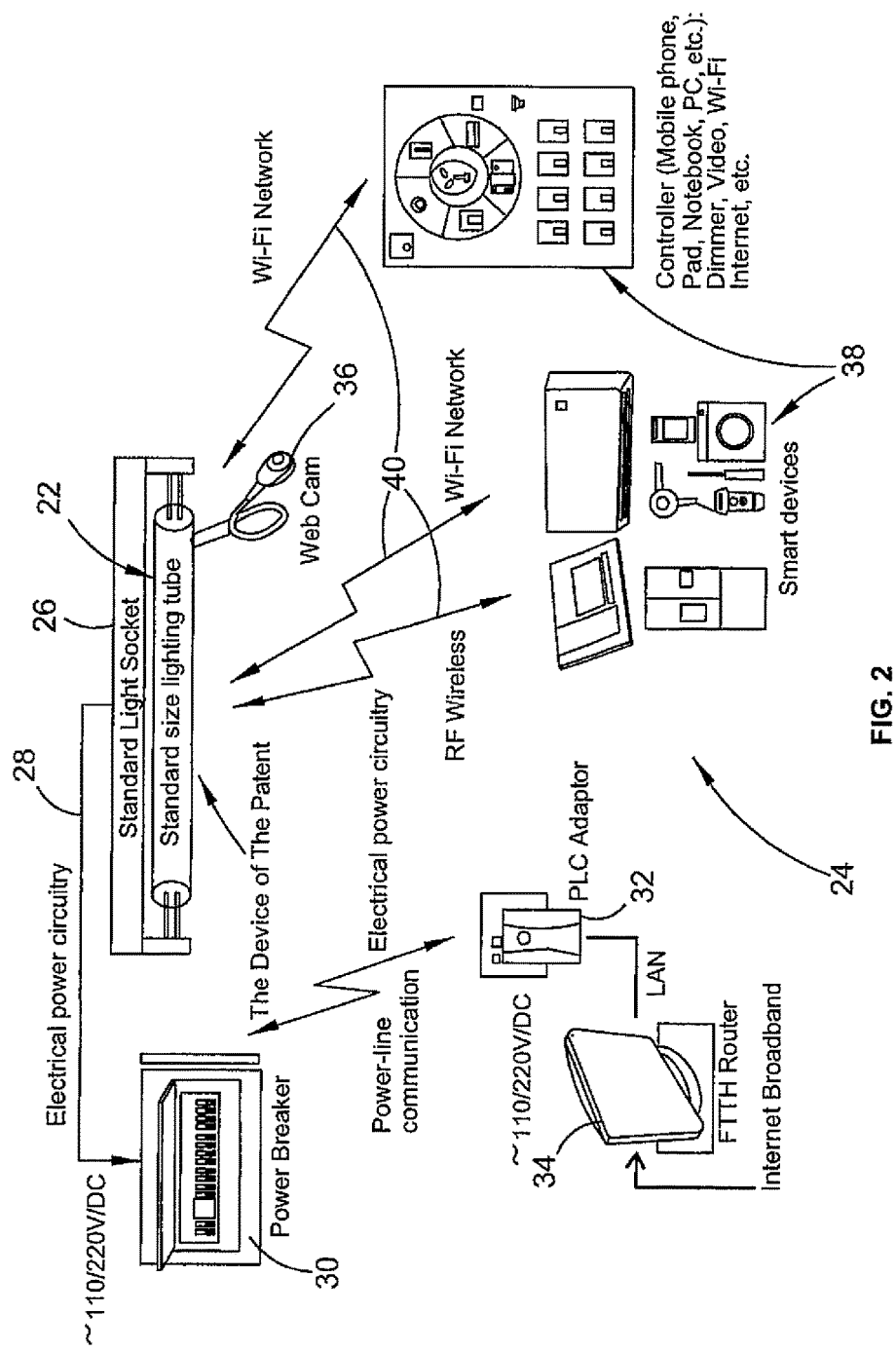
FIG. 2 is a schematic diagram of a network comprising a communications device in accordance with present teachings, and a range of devices that can communication with or through the communications device.

With reference to FIG. 2, a communications device 22 can form part of a converged network 24 of devices. The devices provided in the network 24 are purely illustrative. The type and number of those devices, along with the network (e.g. wireless or wired) by which they connect with the communications device 22 is also purely illustrative and subject to change depending on the configuration of the communications device 22 and the devices with which it is intended to be used.

The communications device 22 is fitted into a standard lighting tube socket 26 that is powered by a mains power circuit 28. Other devices may be provided on the mains power circuit 28 such as standard lighting (not shown), circuit breakers 30, a power line communications (PLC) adapter 32 connected in series with an Internet (broadband) router 34. The PLC adapter 32 (and, similarly, device connectors) can be used to provide a physical (i.e. wired) connection between the transmitter and any receiving devices such as computers, USB cameras, SD cards and so on. Similarly the PLC adapter 32 and any device connectors can be used to provide a physical connection between the receiver and any second device or "information source" such as a computer, laptop, tablet, mobile phone, USB camera, the Internet, a motion sensor, light sensor, gas detector, noise detector, thermal detector, smoke alarm, audio speaker and so on.

The PLC adapter 32 enables the communications device 22 to establish a connection with the Internet through the mains power circuit 28, the PLC adapter 32 and router 34. Without limitation, the PLC may employ any suitable power line communications data format, such as HomePlug or G.hn.

Figure 30:
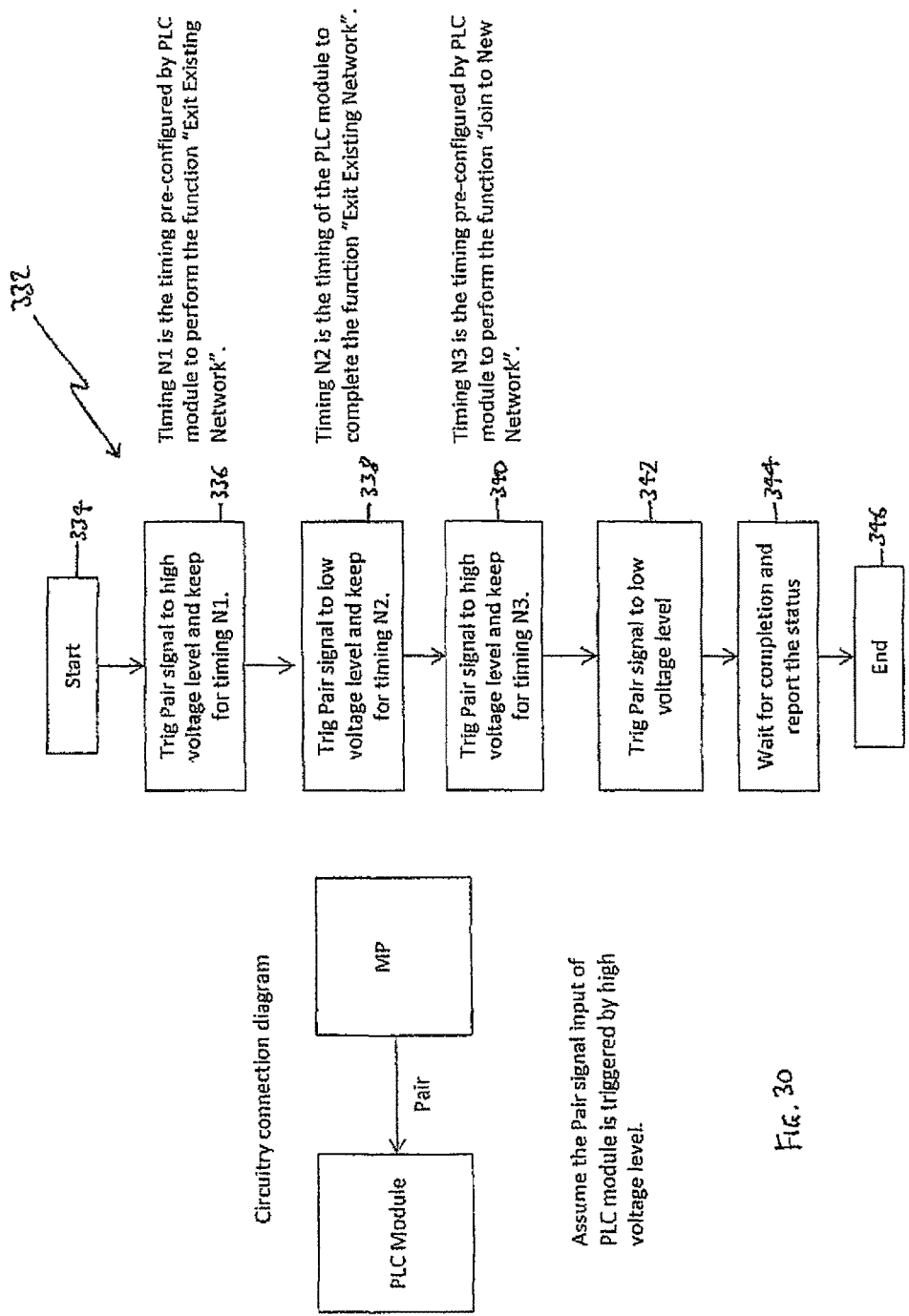
FIG. 30 is a flow chart of the network disconnection and connection process performed by the PLC module of FIG. 8, using a "Pair" signal.

An illustrative embodiment of a program 332 for operating the PLC interface 58 is provided in FIG. 30. The program 332 comprises the following steps:

Step 334: the program 332 starts.

Figure 4:
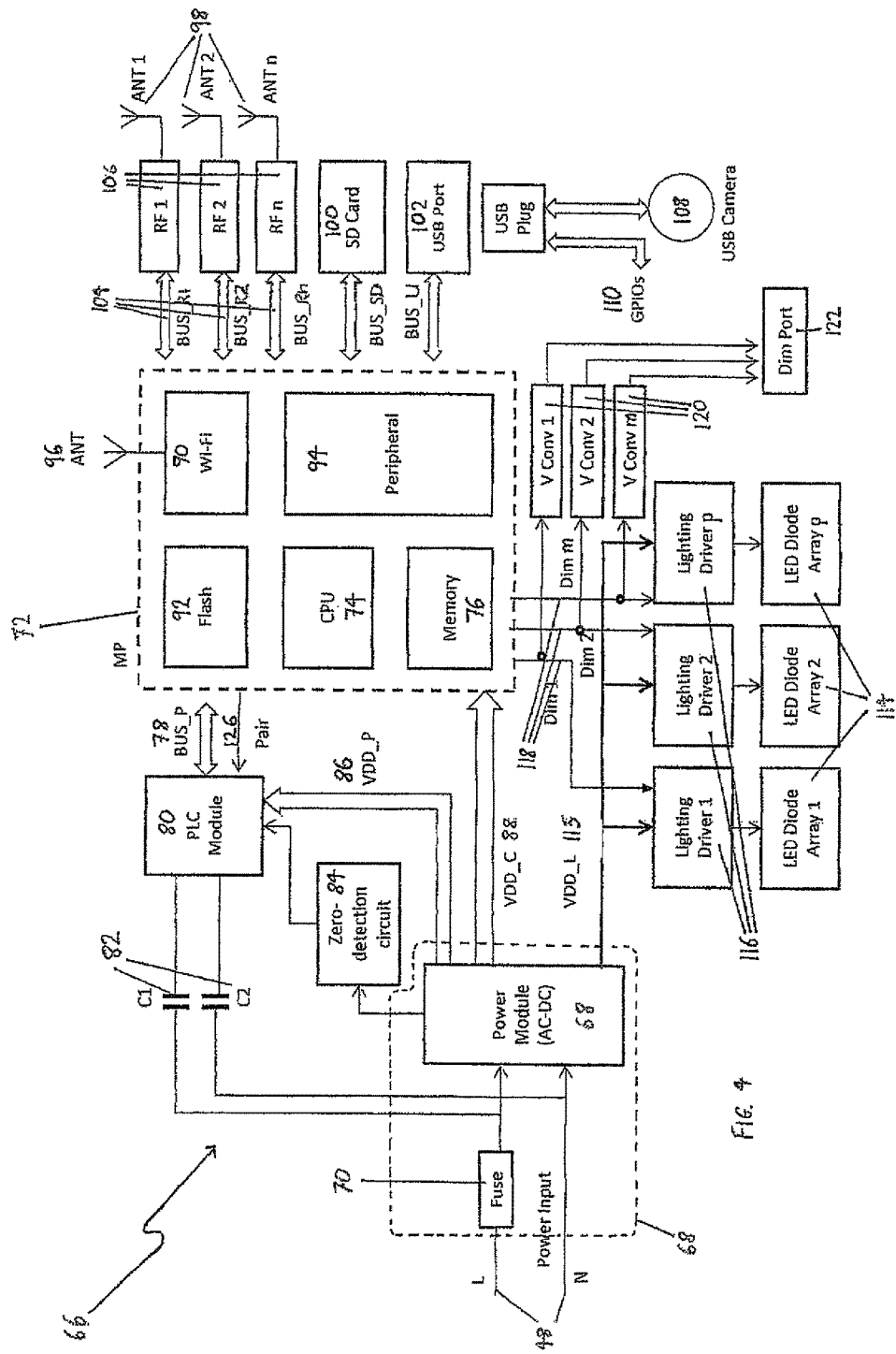
FIG. 4 is a schematic diagram of another embodiment of a communications device in accordance with present teachings.

Step 336: the "Pair" signal line 126 (used to control signal transmission between the main circuit board 72 and the PLC module 80—see FIG. 4) is set to HIGH voltage and maintained at HIGH voltage until a preconfigured timing point is reached (e.g. in the supply voltage phase) at which the PLC interface 58 can commence exiting any existing network to which it is connected.

Step 338: the "Pair" signal line 126 is set to LOW voltage and maintained at LOW voltage until a preconfigured timing point is reached at which the PLC interface 58 can complete exiting any existing network to which it is connected.

Step 340: the "Pair" signal line 126 is set to HIGH voltage and maintained at HIGH voltage until a preconfigured timing point is reached at which the PLC interface 58 can join a new network.

Step 342: after joining the new network the "Pair" signal line 126 is set to LOW.

Step 344: communication completes and a report is generated.

Step 346: program 332 ends.

With further reference to FIG. 2, the communications device 22 has a wired connection with a digital camera 36. The communications device 22 can therefore be configured to receive a feed of images from the camera 36 and to send control signals to the camera 36—e.g. to adjust the depth of focus of the camera 36 or to control the position or orientation of the camera.

The camera 36 is connected with the communications device 22 through a USB socket similar to USB socket 20 as discussed in relation to FIG. 1.

The communications device 22 is wirelessly connected to a number of other smart devices that include, without limitation, tablet computers, hairdryers, air conditioners, shavers, laundry equipment and mobile phones. Some of these devices 38 only transmit information to the communications device 22, other devices 38 only receive control information from the communications device 22, and other devices 38 will be capable of both transmitting information to, and receiving information from, the communications device 22.

The communications device 22 is configured to provide at least one wireless network 40 compliant with a standard communication protocol. Without limitation, the wireless network 40 by which the devices communicate may conform with any communication protocol, such as Wi-Fi 802.11b/g/n, Wi-Fi 802.11ac, Wi-Fi 802.11ad, Bluetooth, Zigbee, IEEE 802.11AC (i.e. Wi-Fi), Z-Wave, RE 433 Mhz, 868 Mhz, 915 Mhz or Infrared. The communications device 22 can be configured and periodically updated to accommodate the particular network(s) with which it is intended to be used.

Figure 3:
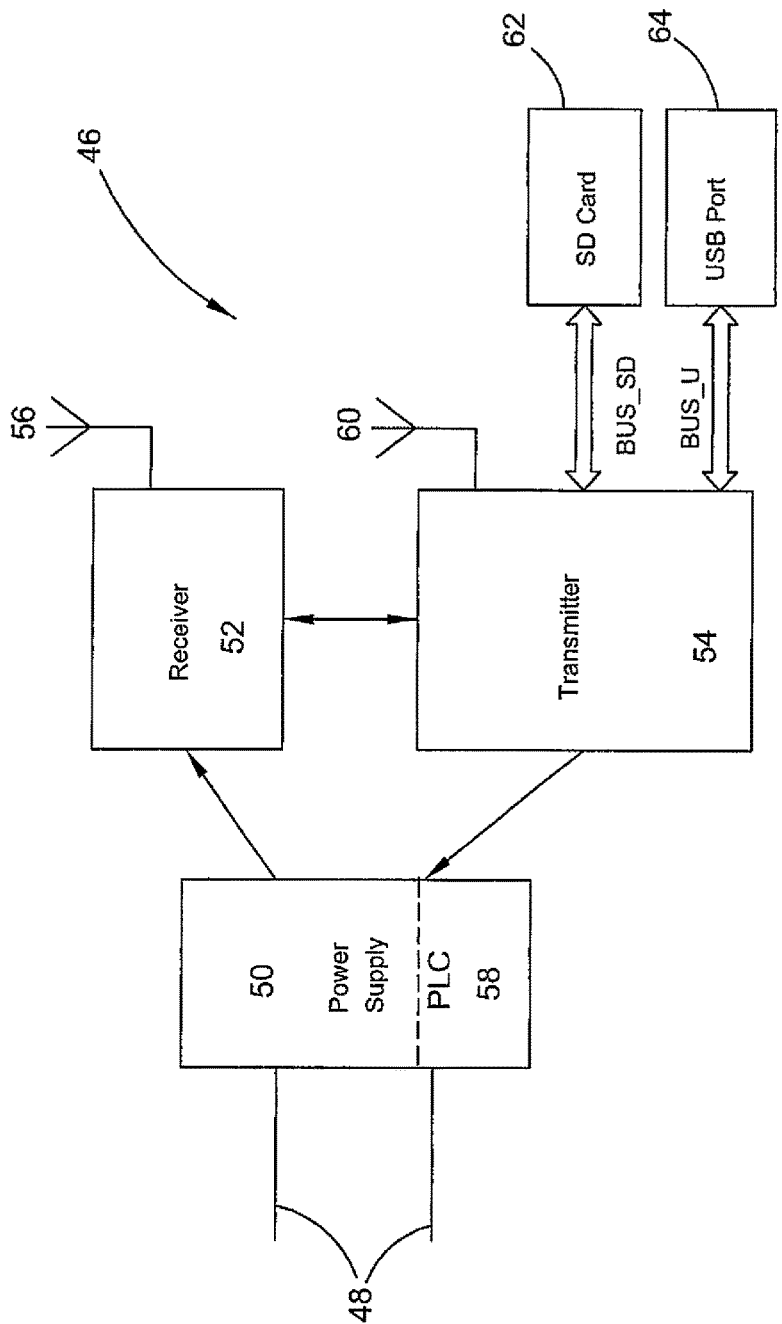
FIG. 3 is a schematic diagram of an embodiment of a communications device in accordance with present teachings.

With reference to FIG. 3, a communications device 46 is connected to mains power lines 48 by a power supply connector 50—the power supply connector may be, or otherwise comprise, a converter such as an Alternating Current (AC) to direct current (DC) converter. The mains power lines 46 supply power to a light socket (not shown) in which the communications device 10 is installed and from which the communications device 10 depends (e.g. by hanging from the power supply connector 50).

The power supply connector 50 performs the necessary inversion from alternating current (AC) to direct current (DC) where necessary, and transforms voltage and current to suit the specifications of the communications device 46.

The communications device 46 also comprises a receiver 52 for receiving incoming information from an information source—e.g. the Internet or a device such as devices 38 shown in FIG. 2—and a transmitter 54 for transmitting outgoing information to Internet or one or more receiving devices—again, such as devices 38 shown in FIG. 2. The outgoing information will often relate to the incoming information such that, for example, a device can be connected to the communications device 46 and be controlled over the Internet or using a mobile phone.

The receiver 52 can connect wirelessly with an information source using a wireless connection 56. This wireless connection 56 may, as needs require, be provided in addition to a PLC connection through the power supply connector 50 (e.g. using a power line communications (PLC) interface 58). Moreover, multiple receivers may be provided for receiving information from a variety of sources.

Similarly, the transmitter 54 transmits information to a receiving device over a wireless connection 60 or, in addition or alternatively, through the PLC interface 58. The transmitter 54 may also transmit information to an SD card in an SD card slot 62 or USB device connected to a USB port 64 where the USB port 64 may comprise a single USB socket or may be a compound port comprising multiple USB sockets and/or GPIOs. Moreover, multiple transmitters may be provided for transmitting information to a variety of devices. In some embodiments the receiver will also be capable of receiving information from SD card slots and USB sockets.

A further communications device 66 is shown in FIG. 4. The communications device 66 comprises a power supply connector 68. The power supply connector 68 includes a power module, presently embodied by an alternating current (AC) to direct current (DC) converter 68, and safety fuse 70. The converter 68 and fuse 70 enable the communications device 66 to safely interface with mains power lines 48. When the fuse 70 blows (e.g. as the result of a power surge) it can be replaced by removing the end cap 42 (see FIG. 1) and substituting the blown fuse for a new fuse.

The communications device 66 includes a receiver and transmitter. In particular, the communications device 66 includes a main circuit board 72 that interacts with antennae 96, 98, PLC module 80 and ports 100, 102 to provide the functions and the receiver and transmitter. The main circuit board 72 includes a central processing unit (CPU) 74, memory 76, and non-volatile memory flash 76 for storing operating system (OS) and driver information for driving one or more of the receiving devices (e.g. LED arrays 114 or devices connected to device connectors 100, 102). The non-volatile memory flash 76 may be configured by receiving incoming configuration information via the receiver (e.g. through the PLC module 80 or RF module 106) so as to update the firmware on the communications device 66 to provide only the functions necessary to operate the communications device 66 and connected devices.

The communications device 66 is able to receive and transmit information using a number of different technologies. These include PLC, wired and wireless technologies. For PLC-based communication, the CPU 74 is connected, via bus 78, to a PLC module 80. The bus 78 permits two-way communication so that information can be received by the receiver (in the main circuit board 74) through the PLC module 80, and can be transmitted by the transmitter (in the main circuit board 74) onto the mains power lines 48 via the PLC module 80 and capacitors 82 (e.g. Y-type capacitors performing a safety circuit-break function and power-line communication signal only pass way).

The "Pair" control signal 126 instructs the network pairing of the PLC module 80. The main circuit board 72 will emulate "Join To", "Join By", and "Change Key" functions that enable the PLC module 80 to communicate over the mains power lines 48 in a known manner. Main circuit board 72 drives this "Pair" voltage level in high or low for a desired period and PLC module 80 receives the signal information (e.g. through one or more general purpose input/output connections (GPIOs)) and conducts the network joining, network exiting, network updating operations. As such, a common practice for implementing "Join To", "Join By", and "Change Key" functions through pressing a physical switch button can replaced by a network connected control interface (e.g. through a mobile phone user interface).

Transmission of data through the PLC module 80, in the embodiment shown in FIG. 4, is governed by a zero-detection circuit 84. The zero-detection circuit detects current inversions (e.g. on 50 Hz or 60 Hz of AC current) and alerts the PLC module 80. In response to signals from the zero-detection circuit 84, the PLC module 80 modulates data transmission rates to maximize the amount of data forced onto the power lines 48. Thus the zero-detection circuit 84 may be used where the input power is AC—e.g. 80V to 260V AC. Where the input power is DC, the converter 68 can be replaced with a DC-DC power module and the zero-detection circuit 84 can be removed.

The communications device 66 is powered by power supply line 86, 88, 115. The power supply line 86 supplies a set of DC (e.g. a bundle of 3.3V, 5V, 12V, etc.) power supplies to the PLC module 80. The main circuit board 72 is powered by power supply line 88, which is a bundle of different DC power supplies, in a known manner. The main circuit board 72 comprises the CPU 74 and memory 76, a Wi-Fi module 90, flash memory 92 and necessary peripheral circuitry 94 each of which receives power at its required voltage and current. Each of the components of the main circuit board 72 operates in a manner comparable to when those components are provided in a standard desktop or laptop computer, to provide the functionality of the present communications device 66.

In addition to transmission via the PLC module 80 over mains power lines 48, the communications device 66 includes a series of radio frequency (RF) antennae. These antennae include a standard Wi-Fi frequency antenna 96 and n radio frequency antennae 98 that operate over a variety of frequency ranges. The communications device 66 also communicates through an SD card slot 100 and USB port 102. Since information can be received over the antennae 96, and can similarly be transmitted over the antennae 96, the RF module(s) 106 may in fact provide the functions of a receiver and transmitter.

To transmit over the Wi-Fi antenna 96, the transmitter (in this case comprising the Wi-Fi module 90) simply transmits that data at the standard Wi-Fi frequency. To transmit data using RF antennae 98 the main circuit board 72 sends information over busses 104 to RF modules 106 that convert or format the data in a known manner for transmission over the antennae 98. Communication with the SD card slot 100 and USB port 102 will also occur in a similar, known manner.

Where a digital camera 108 is plugged into the USB port 102, data from the camera 108 may be formatted and stored on an SD card (not shown) located in the SD card slot 100. The SD card slot 100 and USB port 102 are externally accessible and thus the SD card can be retrieved and stored elsewhere (e.g. in a safe) if desired. Data from the camera 108 may be transmitted in a known manner via power line 48, module 90 and 96, or RF module 106 to the network and Internet.

Figure 5:
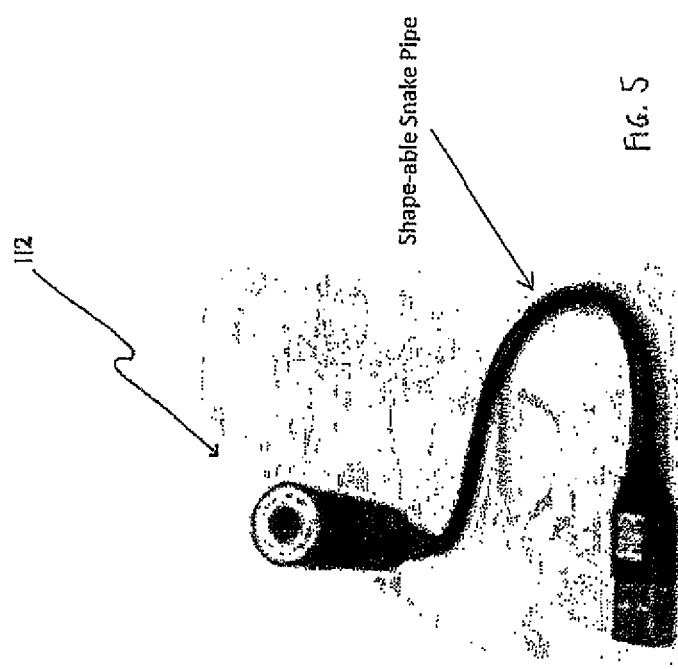
FIG. 5 is a picture of a USB connected and operated digital camera attachable to the communications device of FIG. 4.

The communications device 66 may also provide a series of GPIOs 110. In the present embodiment, the GPIOs 110 are provided by USB port 102, though GPIOs may be equally provided by the main circuit board 72 or another part of the communications device 66. The GPIOs 110 can be connected to any desired operated devices for exporting controlling signal the devices or importing signal from the devices. It will often be desirable that any device plugged into the USB port 102 is light enough to be supported from the USB port 102—in other words, it will not dangle from the USB port 102 and damage the communications device 66. Such an arrangement is achievable using camera 112 as shown in FIG. 5. The USB port 102 may also include a mechanical lock, or similar, to provide additional structural support for connected devices to reduce the likelihood of damage to the USB port 102 and connected device.

While communications device 66 provides connectivity functionality for communication between devices, it also provides lighting control functionality. The communications device 66 includes an illumination device, presently in the form of plight-emitting diode (LED) arrays 114 (each array 114 may comprise one or more LEDs), for illuminating an area around the communications device. Illumination is controlled by control data generated by module 72. The control data is generated by the preprogrammed software in the communications device itself according to the incoming information received by the receiver (or preprogrammed into the communications device itself). The control data includes lighting control information for controlling one or more function(s) of the arrays 114. These functions may include ON/OFF, dim, colour-change, and coordinated lighting functions. The control data is interpreted by a driver 116. One driver 116 is provided for each array 114, to drive operation of the respective array 114. The drivers 116 are powered through a common power line 115—common power line 115 operates at a voltage suitable for the LED arrays 114, such as 12V DC or 3.3V DC. The drivers 116 may be operated independently to independently control lighting functions of the light sources, or may operate in unison to coordinate lighting functions. The drivers may be integrated in a single integrated circuit (IC).

While the power line 115 can be used to provide ON/OFF functionality (standard lighting functionality), modern LED arrays are capable of being dimmed and, in some cases, changing colour or providing infrared light. To afford control of these additional functions, and control of ON/OFF functions, the drivers 116 are connected to the main circuit board 72 by lighting control lines 118. Control or command signals are sent from, for example, a mobile phone, the Internet, or in accordance with a preprogrammed lighting control sequence stored in memory 76 or on an SD card in the SD card slot 100 or on flash 92, to control lighting functions of the LED arrays 114. For mobile phone usage, the communications device may comprise a GSM card (not shown) to enable connection over mobile phone networks.

The available lighting functions may depend on the types of LEDs used in the LED arrays 114 and thus the communications device 66 is configured as needed to provide only that control which is relevant for a particular LED array 114. In addition, the communications device 66 may be wired so that, in the event of failure of the communications device 66, the line to the LED array remains HIGH (i.e. turning the LED array ON). Thus illumination of the LED array will depend on the position of a traditional wall switch.

The communications device 66 also provides a coordinated lighting function whereby signals used to drive lighting drivers 116 are also sent to other lighting devices. To this end, the communications device 66 includes an interface for interfacing directly with one or more further communications devices. The communications device can thereby send signals to the further communications devices. In the present embodiment, the interface comprises voltage converter modules 120 and a lighting control port 122. The voltage converter modules 120 are connected to respective ones of the lighting control lines 118 and modulate the voltage of the lighting control signal (e.g. from 0 to 3.3V or 0 to 10V into some other voltage compatible for external lighting modules) for transmission to other lighting modules connected to the lighting control port 122. Where no such power conversion is required, the voltage converter modules 120 can be excluded.

In this manner, LED arrays (or another illumination device) of multiple lighting tubes or globes can be operated to provide lighting control over an area. Using a similar interface, configuration information can be provided between communications devices for configuring the communications devices.

Figure 6:
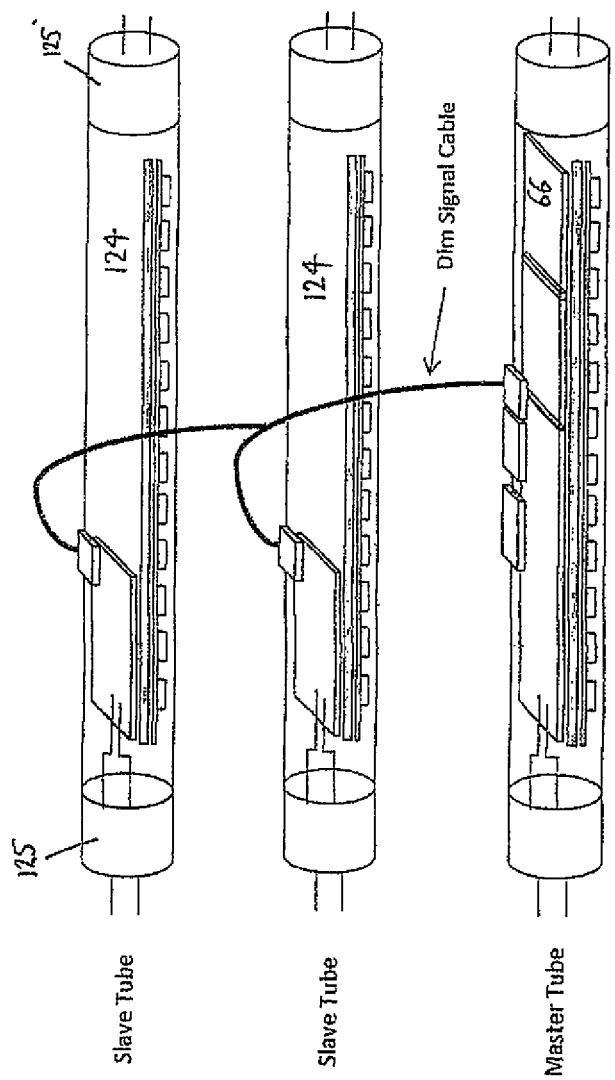
FIG. 6 shows a series of connected communications devices.

With reference to FIG. 6, communications devices 124 can be connected to the lighting control port 122 of the communications device 66 and thereby enable signal transmission to affect a coordinated lighting function. Signals transmitted to the drivers 116 of the communications device 66 are similarly transmitted to the drivers provided in the other communications devices 124 through port 122. Since the communications devices 124 take control signals from the communications device 66, the former may be considered "slave" devices and the latter a "master" device. The "slave" devices may consist of basic lighting and dim circuit to minimize the material cost. Similar control signals may be supplied through the USB port to enable, for example, multiple cameras (one depending from each communications device 66, 124) to be operated in unison.

The lighting control signals and other control signals can result in exactly the same operation in each communications device 66, 124. The lighting control signals can also result in different functionality in the communications devices 66, 124. For example, where the camera 108 of the master communications device 66 is being oriented to train onto a target, cameras (not shown) connected to the slave communications devices 124 may be oriented slightly differently so as to train onto the same target rather than having an orientation parallel to that of the camera 108 attached to the master communications device 66.

Figure 7:
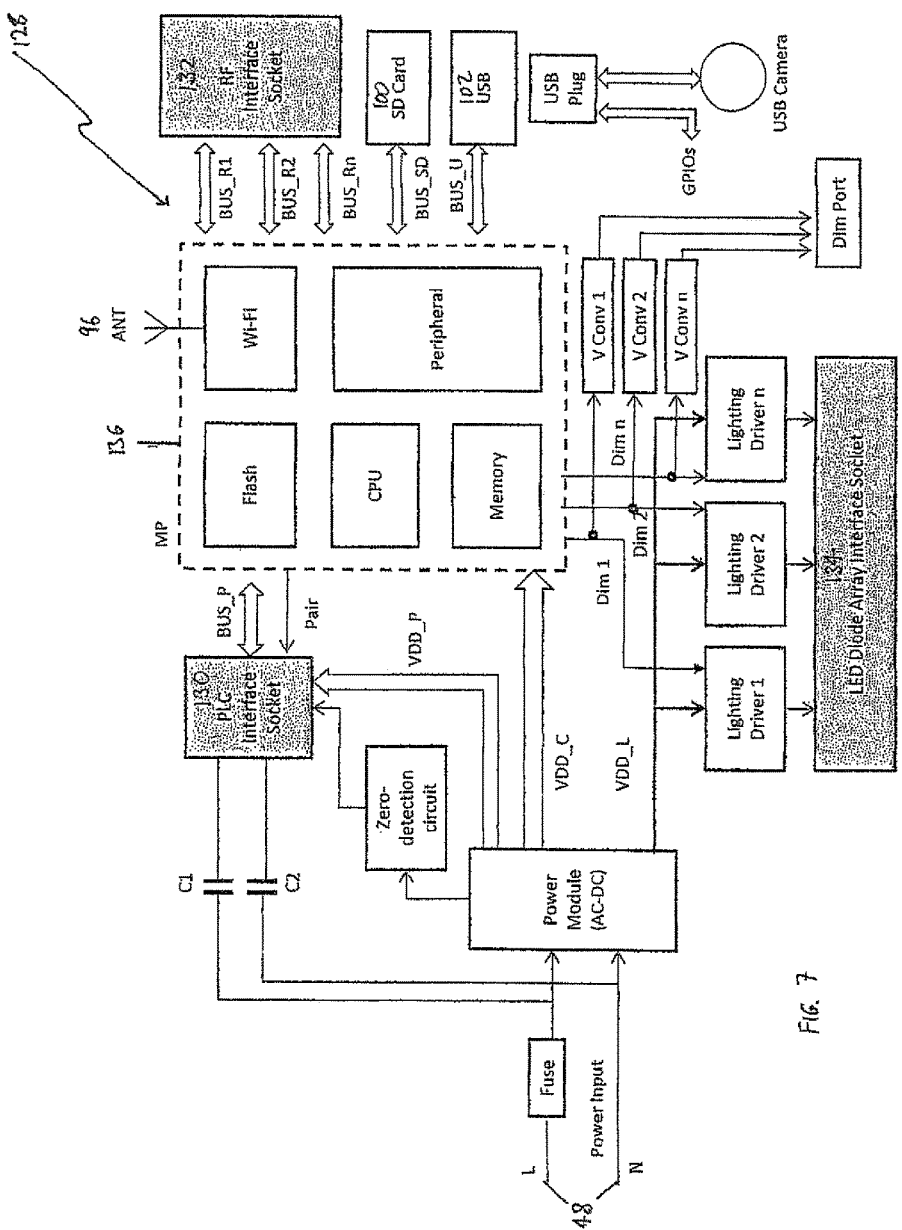
FIG. 7 is a schematic diagram of another embodiment of a communications device in accordance with present teachings.

FIG. 7 shows a communications device 128 similar to that of FIG. 4, with the exception being that the PLC module 80, RF modules 106 and LED arrays 114 have been replaced with interface sockets 130, 132, 134 respectively. While the communications device 66 can be connected to similar devices through its various outputs—such as the GPIOs 110—communications device 128 provides a more modular and configurable device.

The PLC interface socket 130 enables installation of a PLC module (see FIG. 8) that uses, for example, a particular desired communication specification to transmit over the mains power lines. Without limitation, such a specification may be HomePlug, or G.hn, or others. To this end, a HomePlug specification PLC module is installed to enable the HomePlug specification communication on power line circuitry. A G.hn specification communication PLC module is installed to enable the G.hn specification communication on power line circuitry. Without installation of any of PLC module, the communication device can communicate with other network devices through the wireless network. Thus the total installation cost can be reduced in an installation area.

Figure 8:
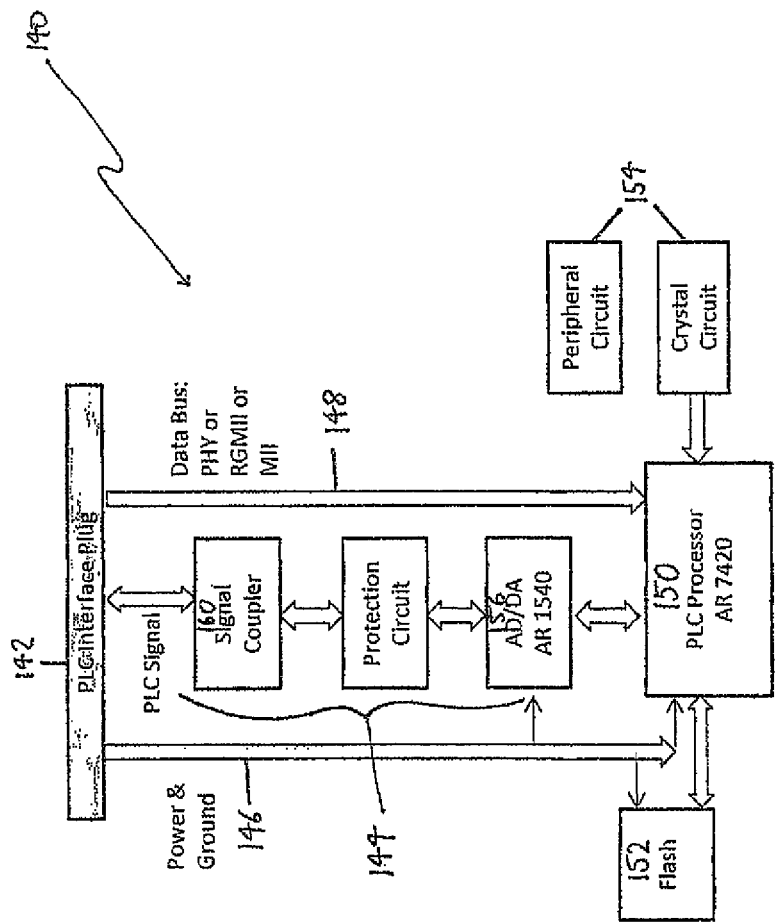
FIG. 8 is a schematic diagram of a power line communications (PLC) module attachable to the communications device of FIG. 7.

An illustrative embodiment of a PLC module 140 is schematically shown in FIG. 8. The circuitry of the PLC module 140 in the example is for use with the HomePlug power-line communication specification. The PLC module 140 comprises a PLC interface plug 142, signal modulation and protection circuitry 144, power and ground line 146, data bus 148, PLC processor 150 (based on chip AR7420), flash memory 152 and peripheral circuitry 154.

The PLC interface plug 142 enables the PLC module 140 to connect with PLC interface socket 130 (see FIG. 7). The signal modulation and protection circuitry comprises an analogue-to-digital/digital-to-analogue converter module 156, a protection circuit 158 and signal coupler 160. Various different signal modulation and protection modules will be required depending on the type of PLC processor used. In the present case, the circuitry has been selected to suit an AR7420 PLC processor.

Peripheral circuitry may comprise a crystal oscillator circuit 154 for timing delivery of data onto the mains power lines (not shown).

Other components may be required depending on the type of PLC processor used with the communications device 128, and all such components and alternative version of PLC modules are intended to fall within the scope of the present disclosure.

In some cases, no PLC module will be used. In such cases the communications device 128 can operate as a repeater. For example, a communications device without any PLC module can receive a wireless signal from a laptop computer, transmit that signal to one or more other communications devices, and so on until the relayed signal reaches an Internet router. That Internet router may be a PLC enabled router on a different power circuit, or may not be PLC enabled. In other words, where no PLC module is present the communications device becomes a networked device by connecting to another device (e.g. communications device of the present disclosure or a Wi-Fi router) through which the Internet can be accessed.

The RF socket interface 132 and LED array socket interface 134 enable connection of any desired RF transmitters and LED arrays (not shown) to provide desired functionality. For example, an LED array providing only a single colour of visible light may be exchanged for an LED array having colour change functionality or infrared light functionality. The interchangeability of LED arrays also enables replacement of those arrays when one or more of the associated LEDs blows.

Figure 9:
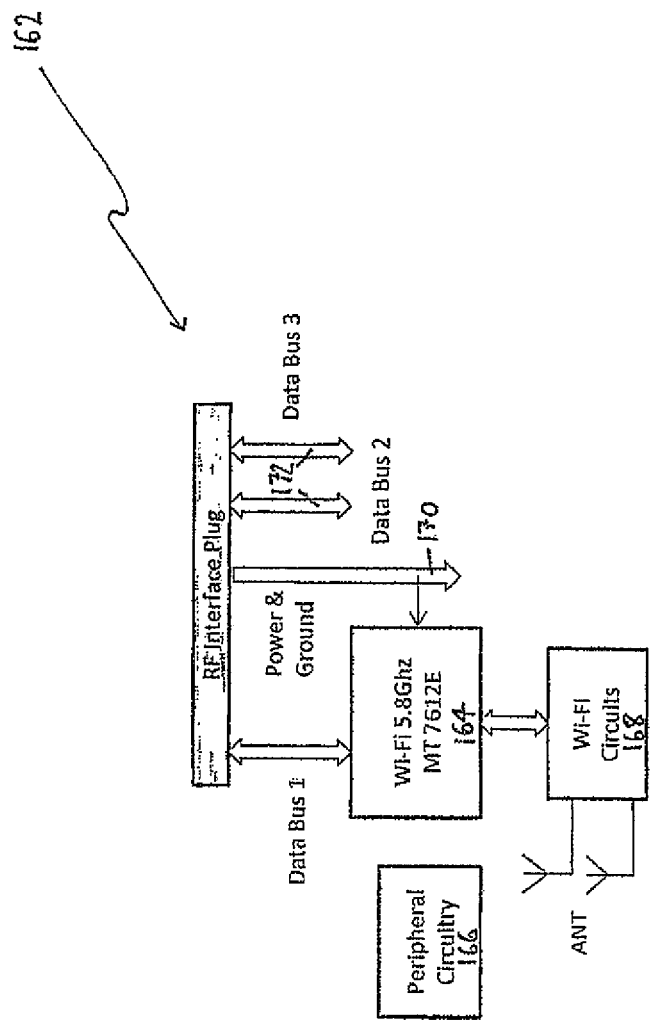
FIG. 9 is a schematic diagram of a radio frequency (RF) module attachable to the communications device of FIG. 7.

With regard to RF transmitters, FIG. 9 provides an illustrative, schematic embodiment of an RF module 162 (i.e. RF transmitter). The RF module 162 is built around an MT 7612E chip 164 operating at 5.8 Ghz using standard IEEE 802.11AC communication protocol. The chip 164 is supported by peripheral circuitry 166 and provides wireless communication through Wi-Fi circuits 168. It will be appreciated that Wi-Fi circuits 168 can be substituted for other circuits operating outside the Wi-Fi standard frequency range.

The RF module 162 further includes power and ground lines 170 and a number of data transfer busses 172.

A communications device may be designed to operate with specific PLC and RF modules and LED arrays plugged into the sockets. However, communications device 128 (and communications device 66) is configurable to operate with various different PLC and RF modules and LED arrays. Configuration can occur using a device plugged into the SD card slot 100, USB socket 102, or by receiving information transmitted via the PLC module 80/interface socket 130 over the mains power lines 48 or through with Wi-Fi/RF antennae 96, 98.

The communications device 66, 128 may emit a signal (e.g. flashing light) where incorrect drivers are installed and the correct drivers are unavailable.

With further reference to FIG. 7, the main circuit board 136 comprises a single circuit component with integrated CPU, memory, peripheral circuits, Wi-Fi circuit and Flash memory. In the communications device 174 shown in FIG. 10, the main circuit board has been substituted for various individual modules, with the CPU being replaced by a MT7620A chip 138. The MT7620A chip provides Wi-Fi circuitry and operates as a transceiver.

Figure 10:
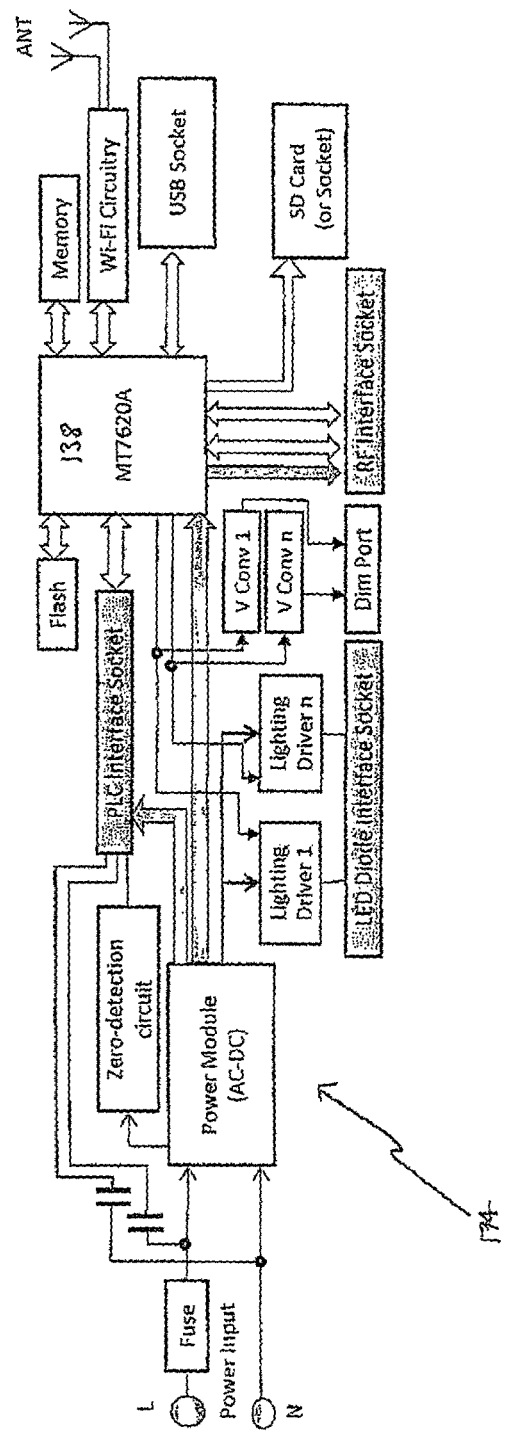
FIGS. 10 to 24 are schematic diagrams of other embodiments of communications devices in accordance with present teachings.

FIG. 10 illustrates that the present disclosure covers the provision of internal circuitry (e.g. power supply connector, Wi-Fi module, CPU, memory, Flash, Peripheral interface circuitry, etc) on a single chip, multiple separate chips, using bespoke or mass-produced components and replaceable components etc.

FIGS. 11 to 16 provide alternative arrangements similar to the communications devices 66, 128, 174 previously described. FIGS. 11 to 16 illustrate that the internal circuitry can vary greatly while remaining within the spirit and scope of the present teachings.

Figure 11:
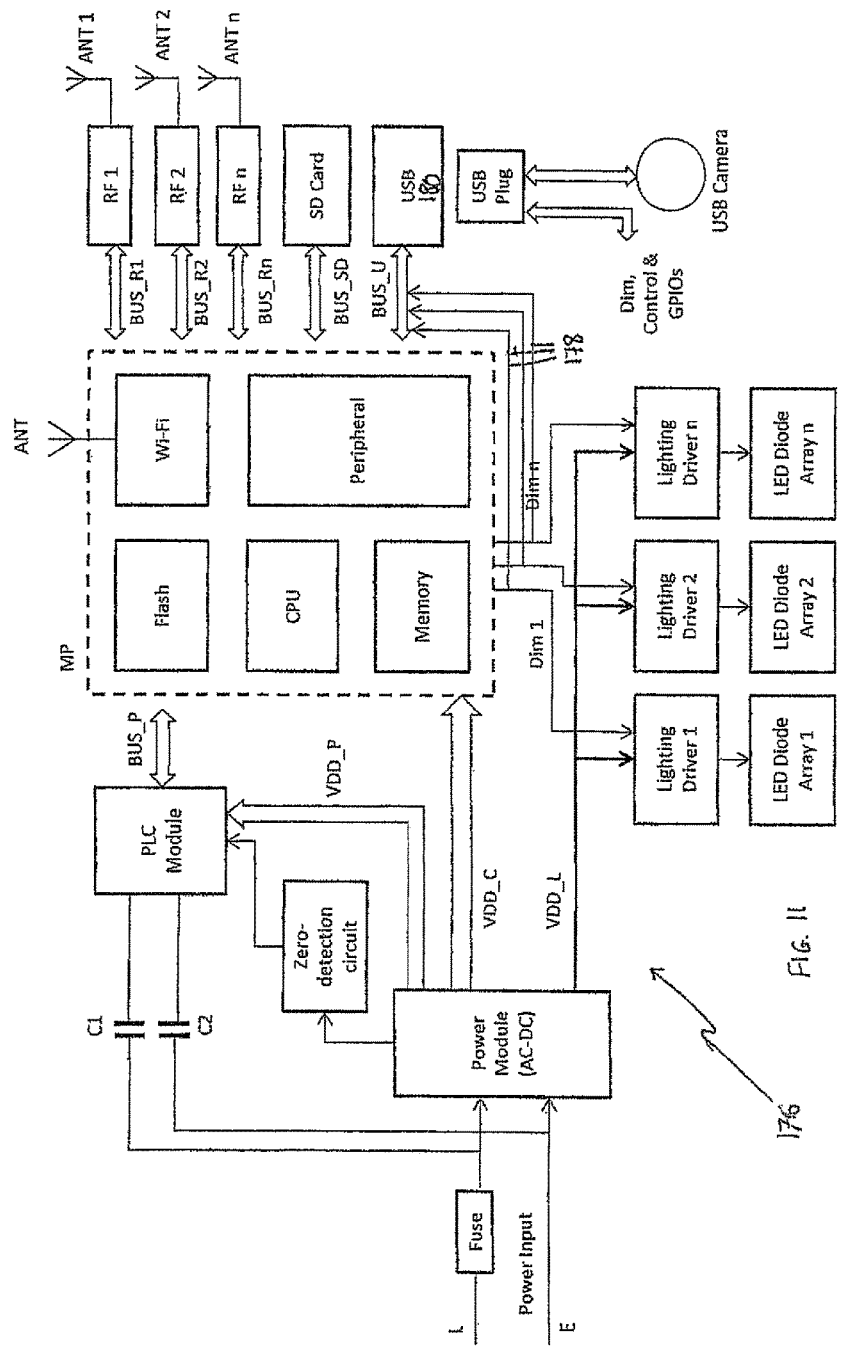

In particular, communications device 176 of FIG. 11 is similar to communications device 66 of FIG. 4, with the exception that lighting control signals are transmitted through lighting control lines 178 to USB module 180 rather than through lighting control port 122. Thus lighting control signals are sent through the USB module 180 to connected devices.

Figure 12:
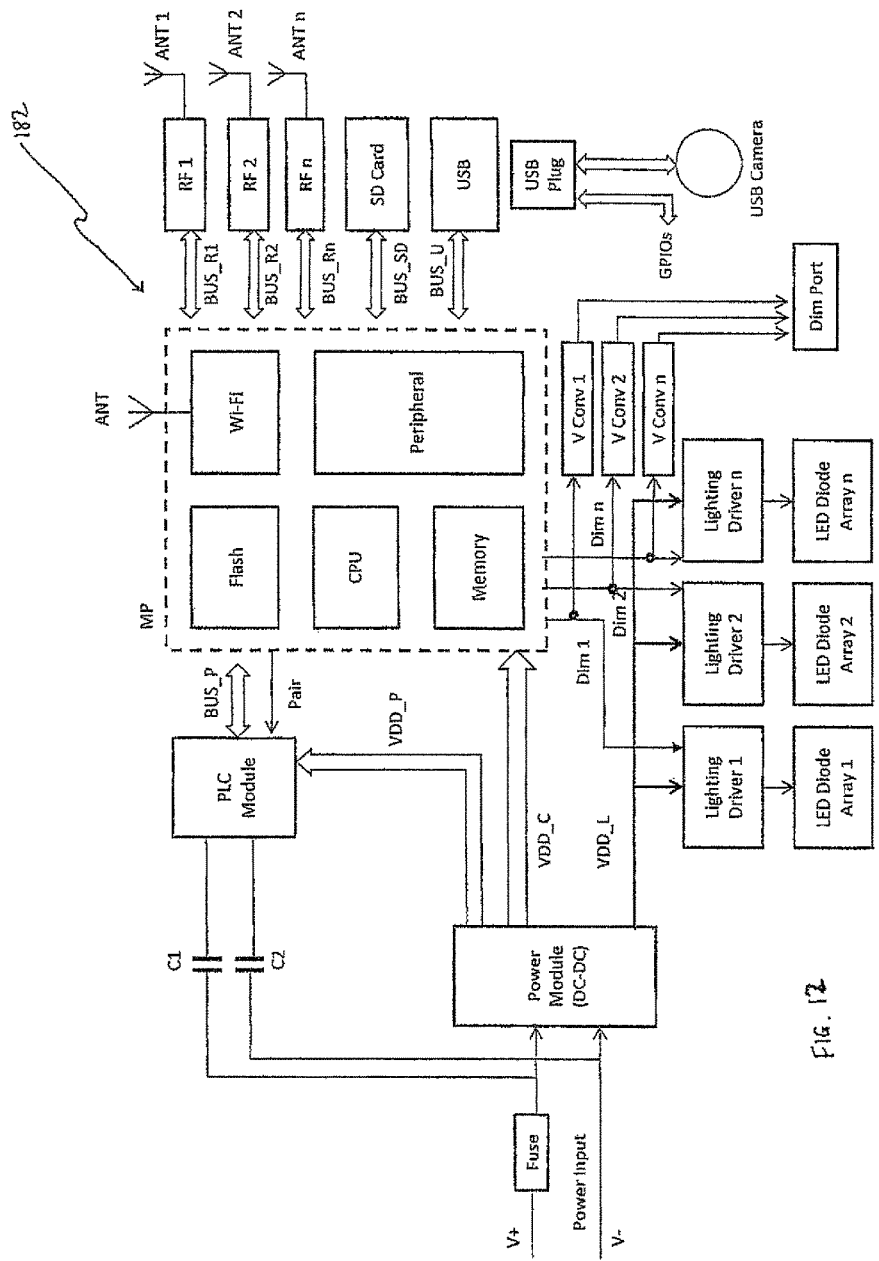
Figure 13:
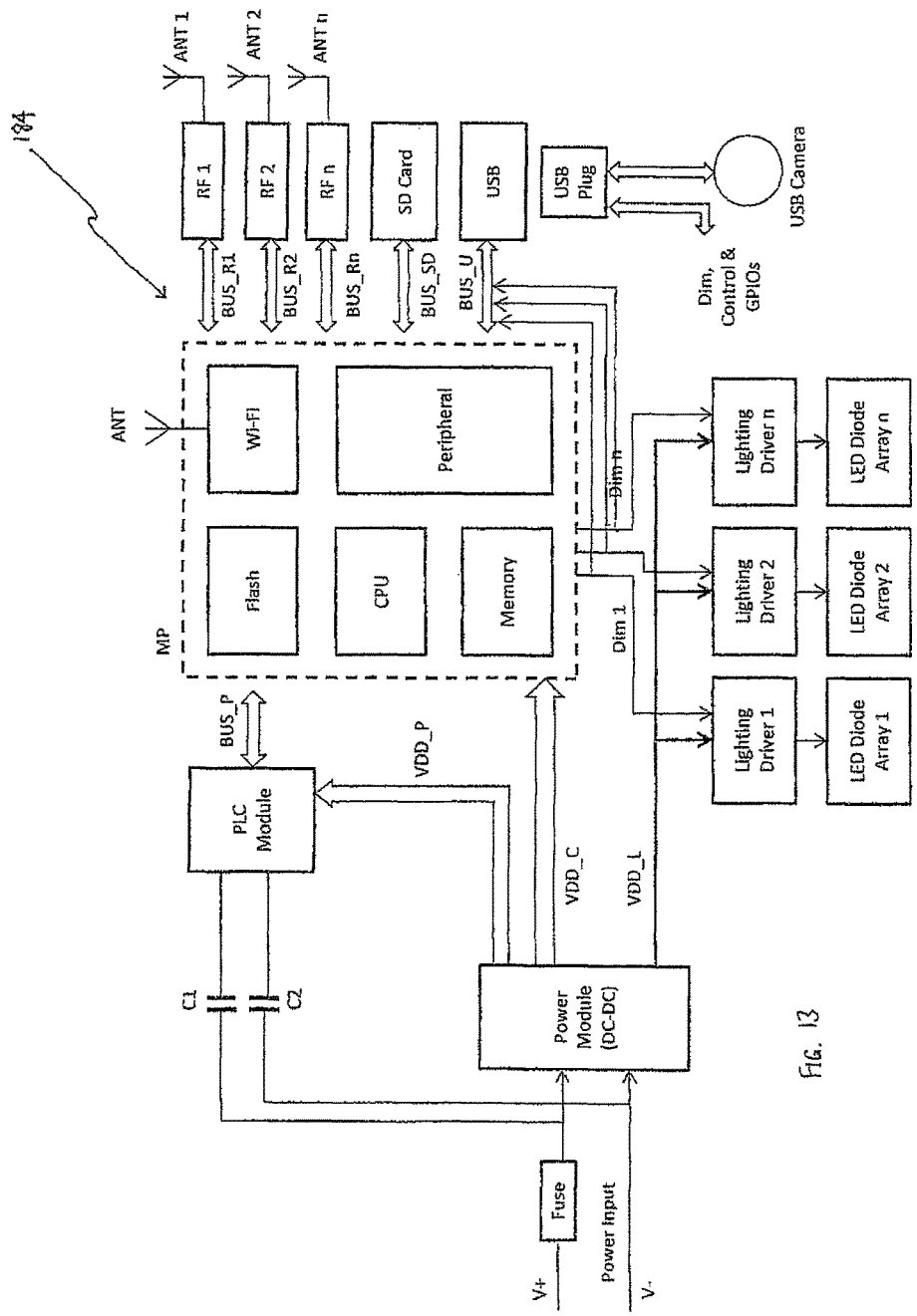

The communications devices 182, 184 of FIGS. 12 and 13 are similar to communications devices 66, 176 of FIGS. 4 and 11 respectively, with the exception that no zero-detection circuit is present. This is the result of the mains power lines supplying DC power.

Figure 14:
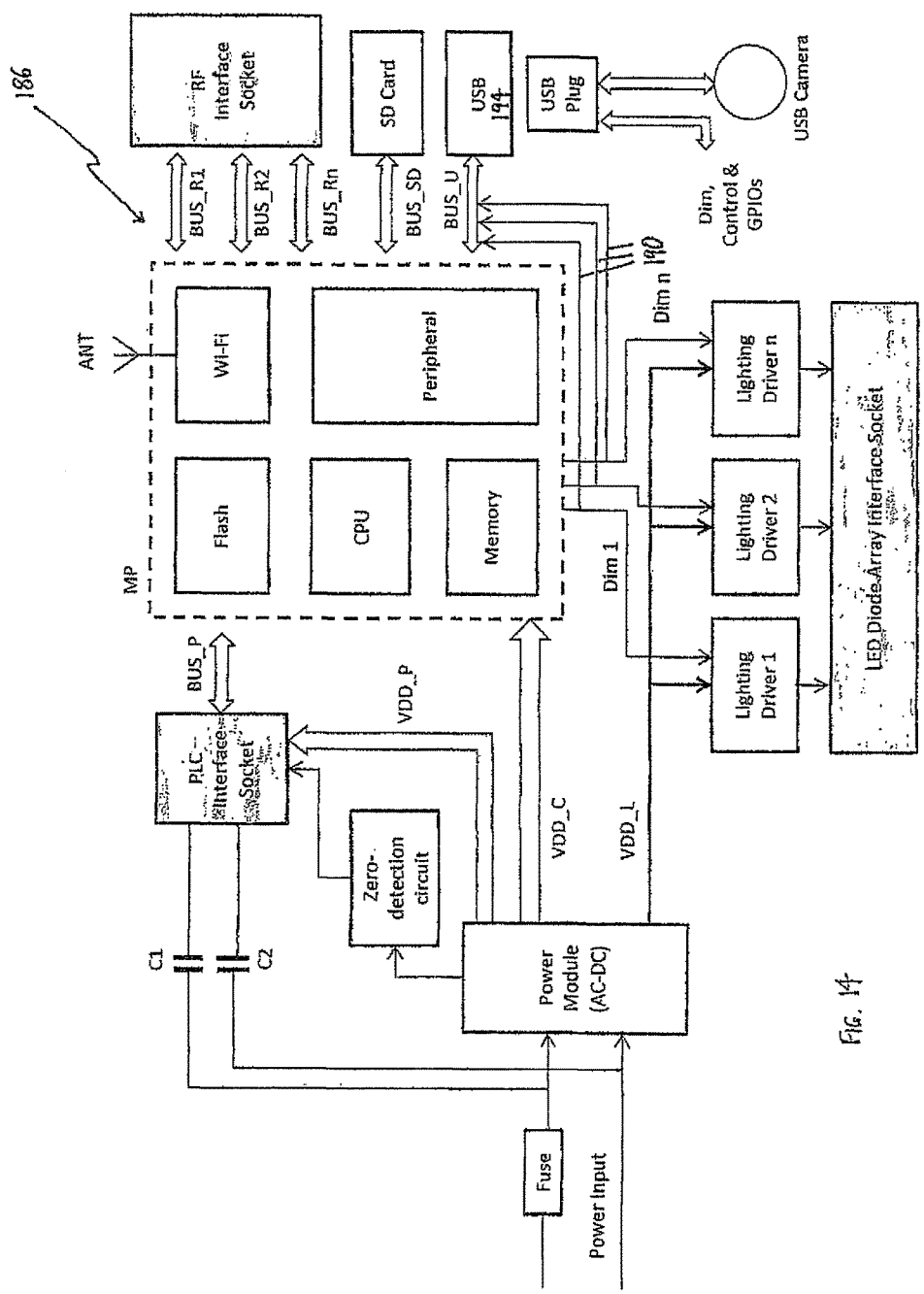
Figure 15:
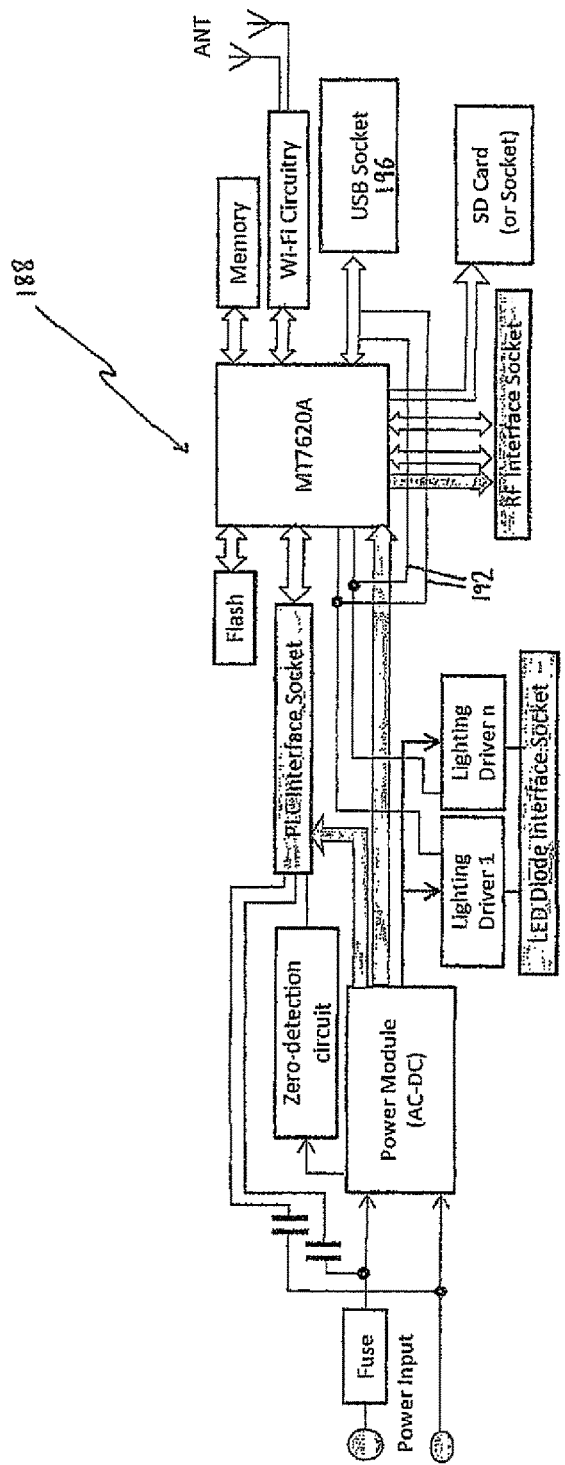

Similarly, the communications devices 186, 188 of FIGS. 14 and 15 are similar to communications devices 128, 174 of FIGS. 7 and 10 respectively, with the exception that lighting control signals are transmitted through lighting control lines 190, 192 to USB module 194, 196 rather than through voltage converters to a lighting control port. Thus lighting control signals are sent through the USB module 180 to connected devices. Module 188 "MT7620A" chip is provided for illustration purposes only and may be replaced with another chip providing appropriate functionality.

Figure 16:
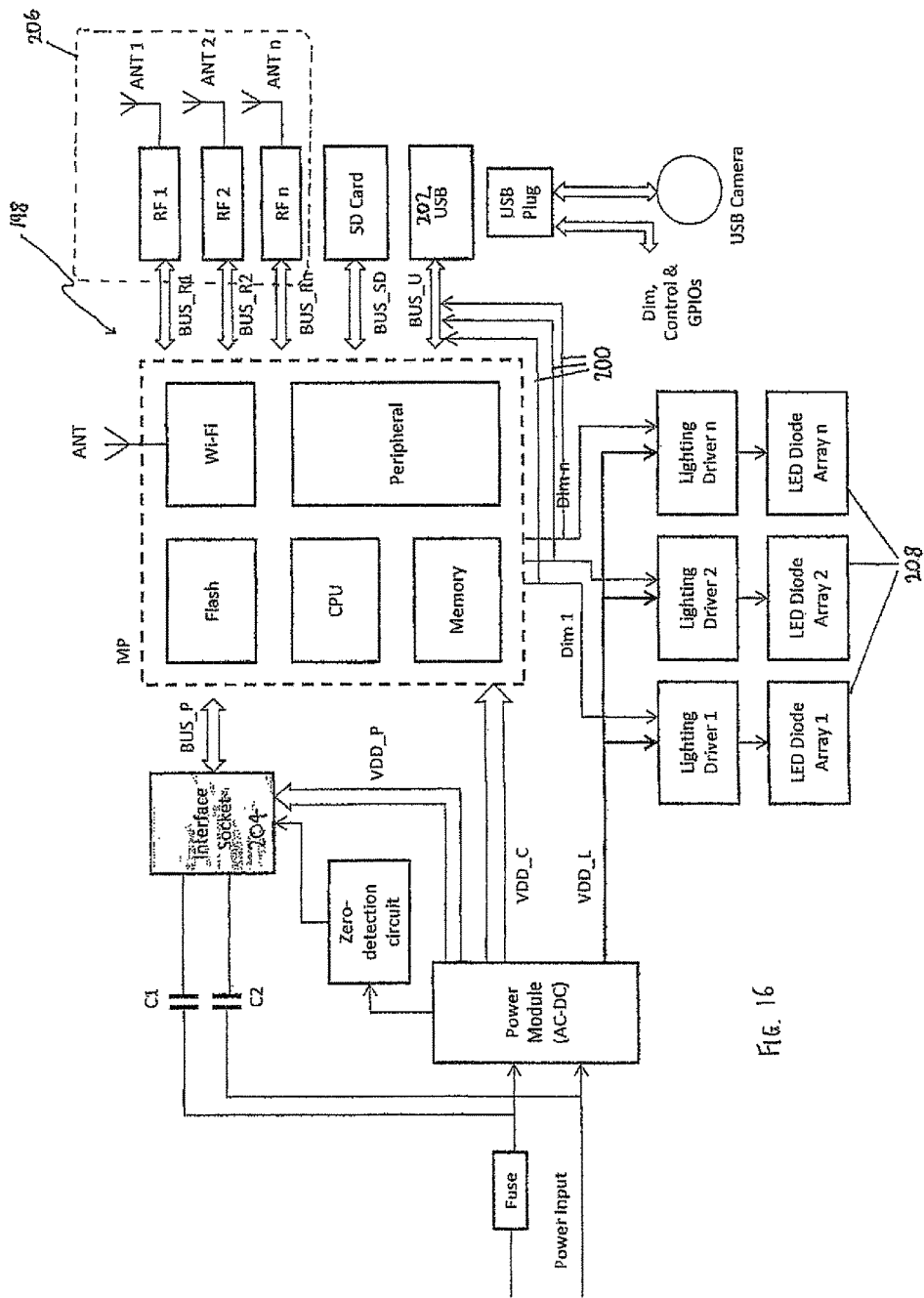

In addition, communications device 198 of FIG. 16 is essentially a hybrid of communications devices 66, 128 of FIGS. 4 and 7, in which lighting control lines 200 connect to USB module 202, PLC interface socket 204 is provided yet the RF interface 206 and LED arrays 208 are hardwired.

Figure 17:
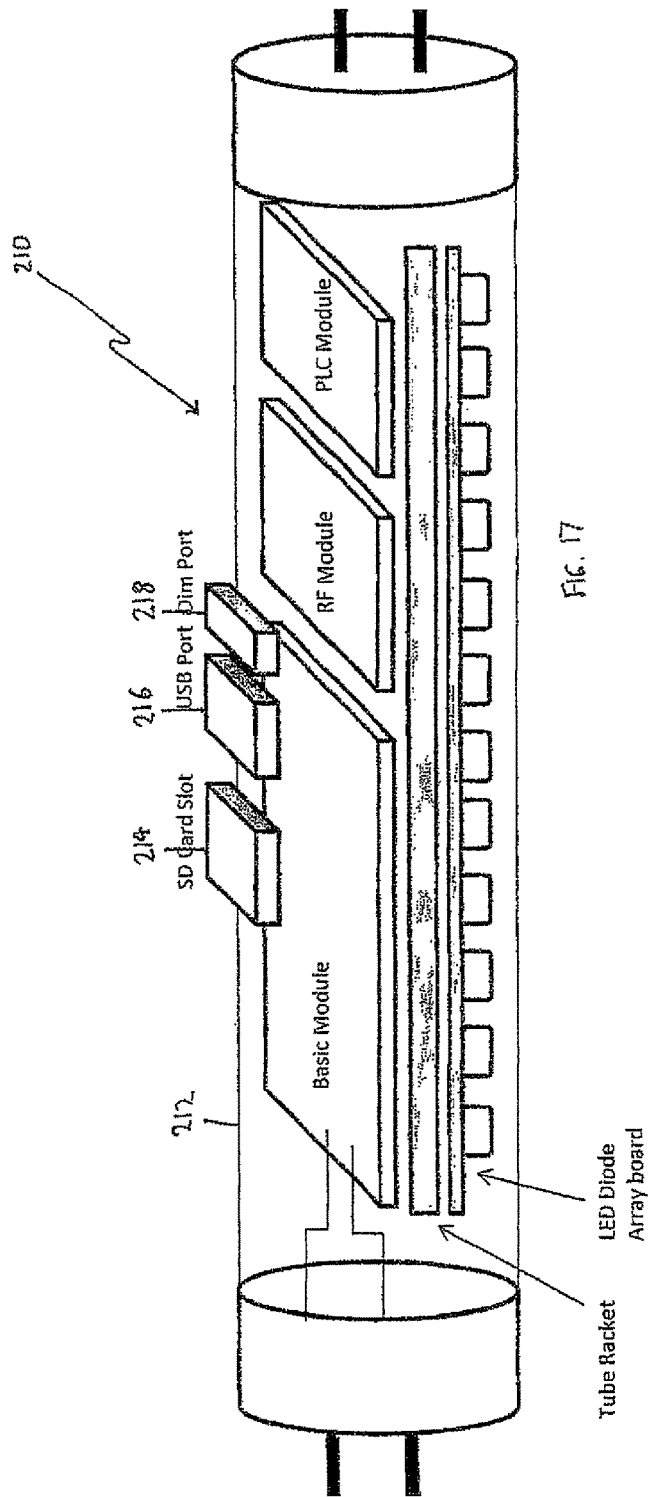

FIG. 17 shows a lighting tube communications device 210 similar to the communications device 10 of FIG. 1, with the exception that the tube is adapted for use in a different type of light fitting. In particular, the communications device 210 can be used to replace a fluorescent light tube in a fluorescent light fitting.

Figure 18:
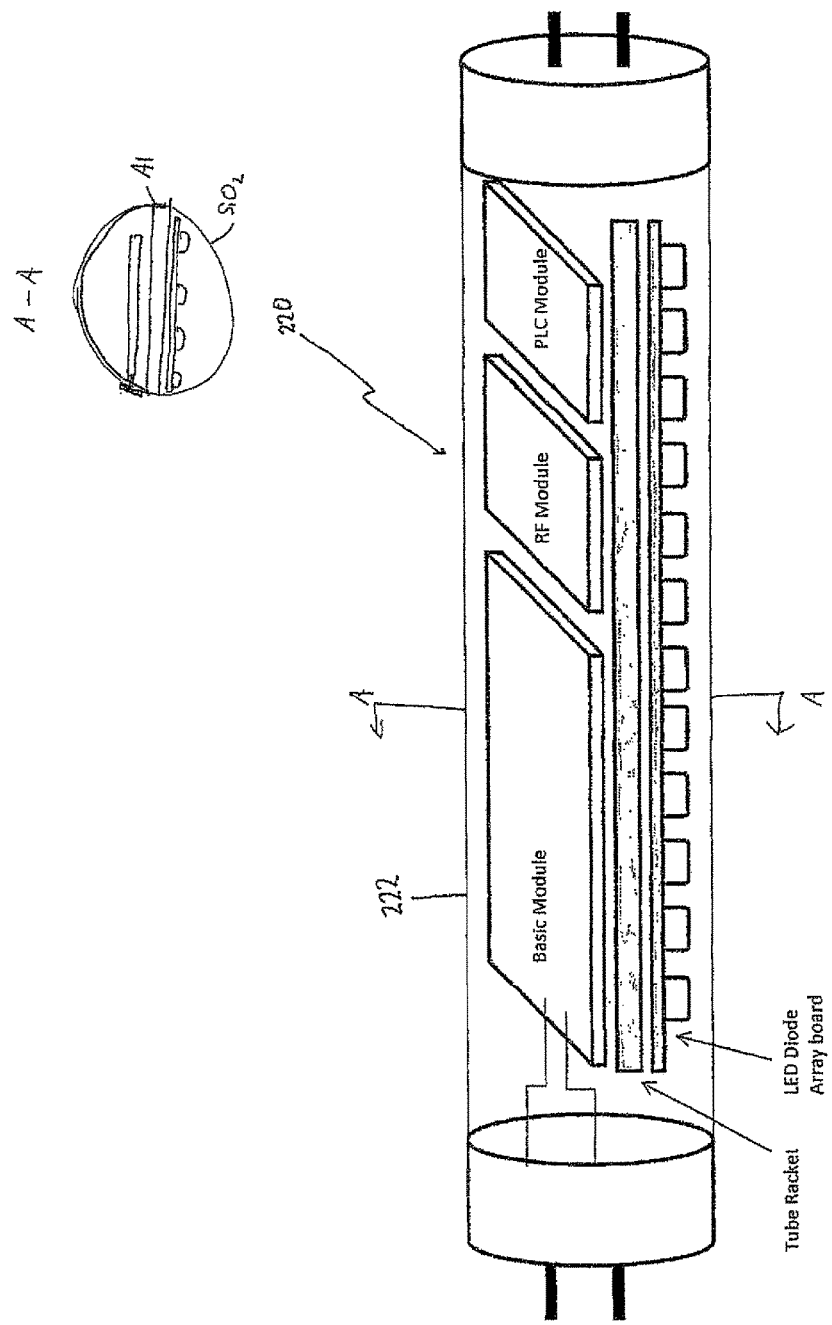

While the communications device 210 of FIG. 17 includes an SD card slot 214, USB module 216 and lighting control port 218 extending through the housing 212, FIG. 18 provides a communications device 220 the circuitry of which is fully enclosed within the housing 222. In other words, there are no slots or sockets accessible from outside the housing. For humid environments, communications device 220 may have greater longevity as a result of easier prevention of moisture ingress. However, such a device requires all communication to be performed using a PLC module, wireless connection or magnetic or light communication through the housing. To improve the longevity of devices having externally accessible device connectors such as SD card slots, USB sockets and modules, and lighting control ports, those device connectors can be sealed against that housing to provide similar protection. The seal thereby isolates the internal volume of the housing from ambient atmosphere. Even with the seal in place, the device connectors themselves may remain susceptible to deterioration from environmental effects.

FIGS. 19 to 24 show alternative embodiments of communications devices in the form of a light bulb or globe for connecting to a standard light bulb or globe fitting. The embodiments in FIGS. 19 to 24 demonstrate the versatility of the communications device in that it can be designed to fit into almost any standard or bespoke lighting tube or light globe, and be as easy to install as replacing a lighting tube or light globe.

Figure 19:
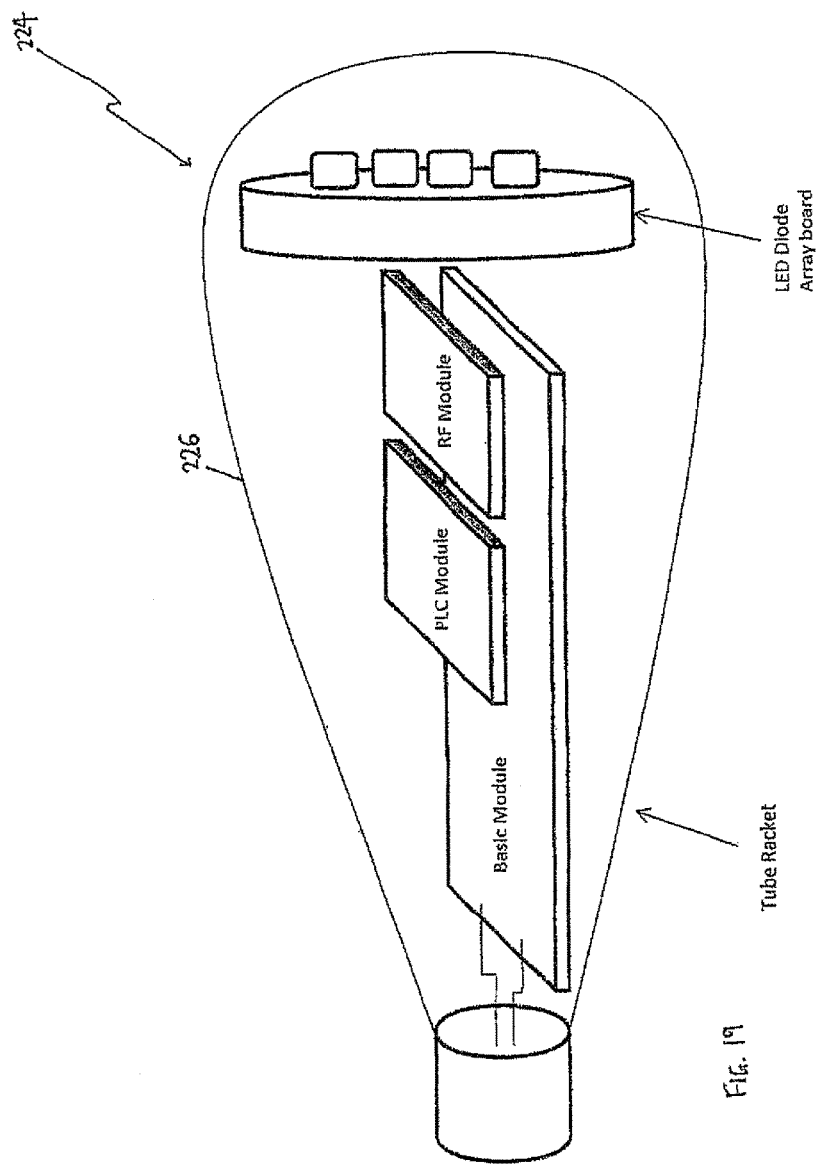

FIG. 19 shows a light globe communications device 224 having comparable components to the communications device 220 of FIG. 18. There are no externally accessible device connectors. As such, the circuitry of the communications device 224 is entirely housed within the light globe shaped housing 226.

Figure 20:
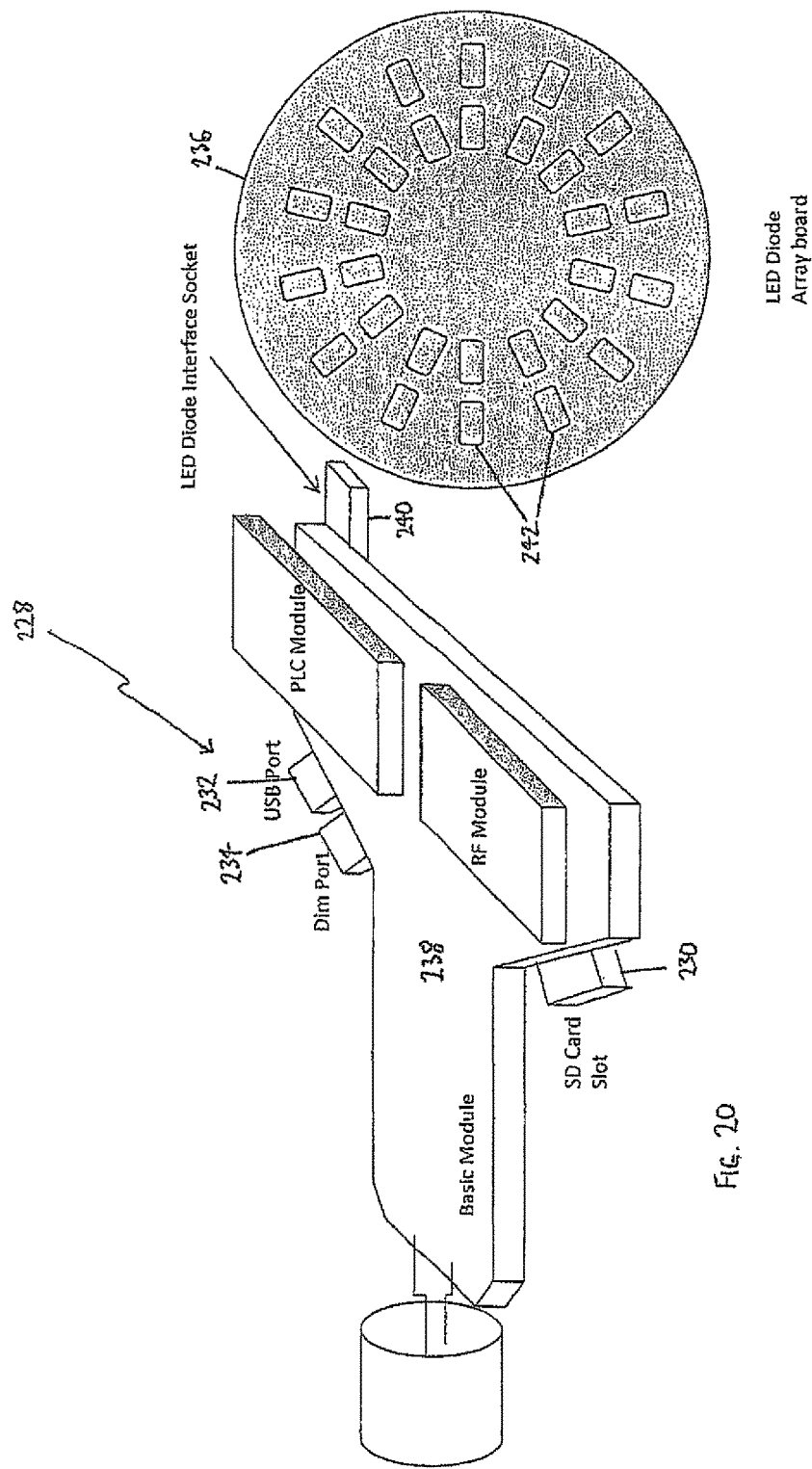
Figure 21:
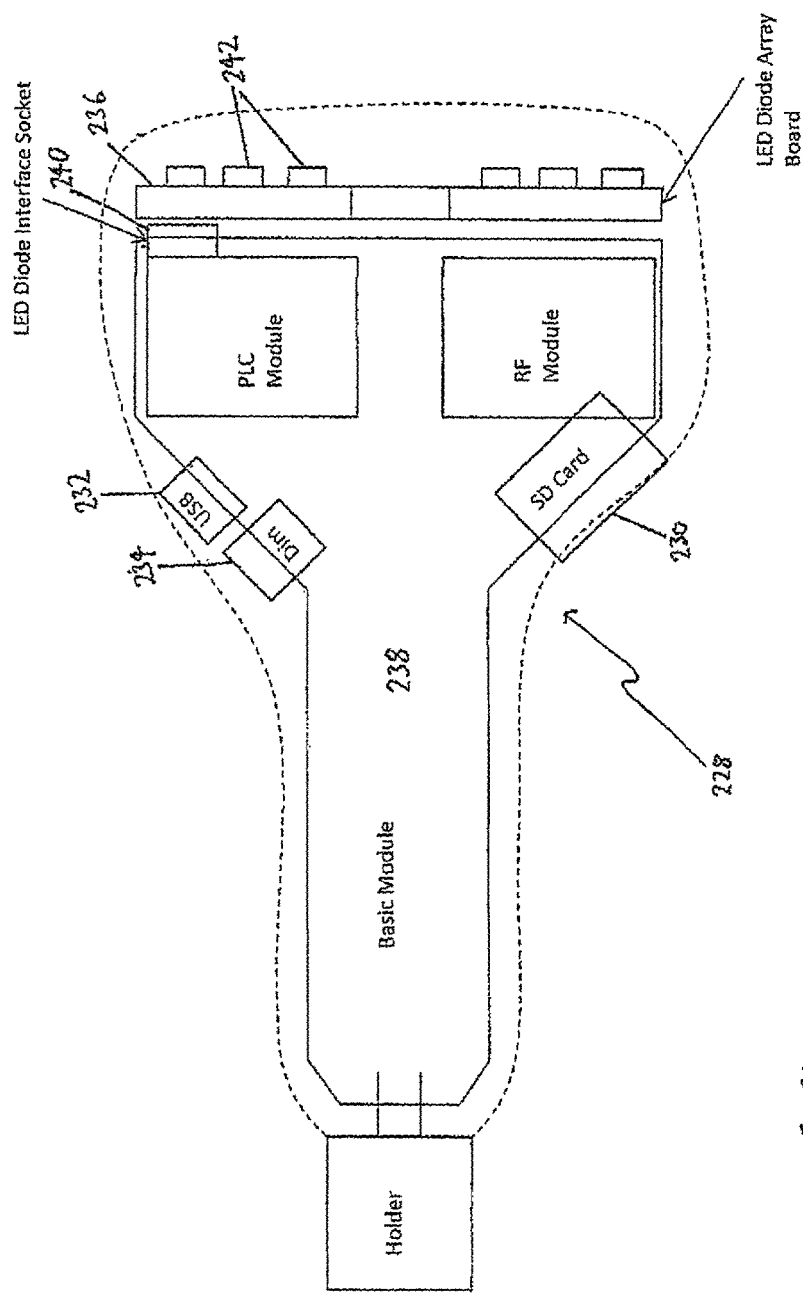

FIGS. 20 and 21 show a light globe communications device 228 including externally accessible device connectors comprising an SD card slot 230, USE socket or module 232 and lighting control port 234. The communications device 228 comprises an LED array 236 connected to a main circuit board 238 by an LED interface socket 240. The individual LEDs 242 of the LED array 236 can be either individually or collectively controlled to switch ON or OFF, change colour and change light intensity (i.e. dim or brighten).

The LED array 236 may be replaced (e.g. when it ultimately dies) or substituted for another LED array having different functionality, shape (i.e. to fit within a different tube or globe) or luminous intensity as desired.

Figure 22:
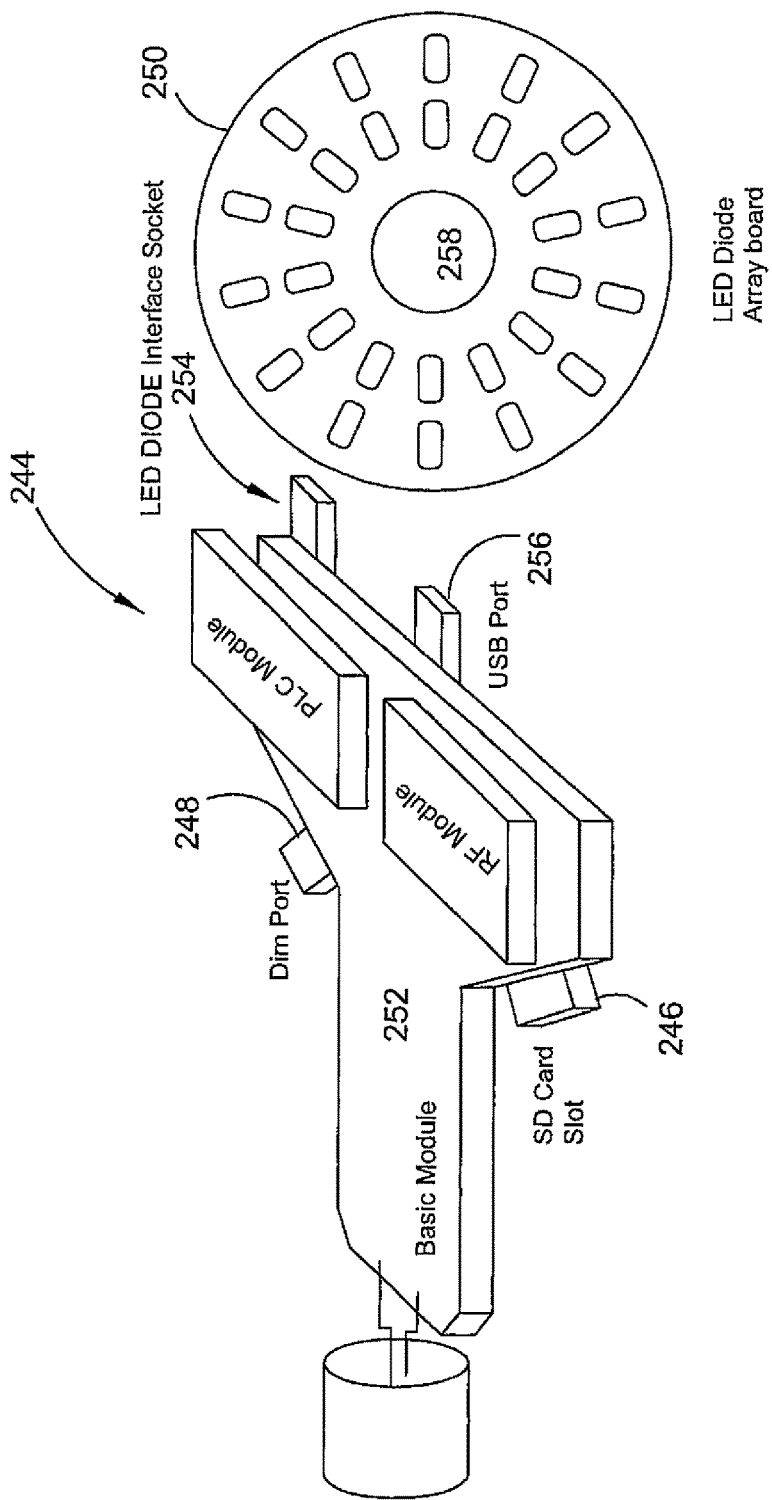
Figure 23:
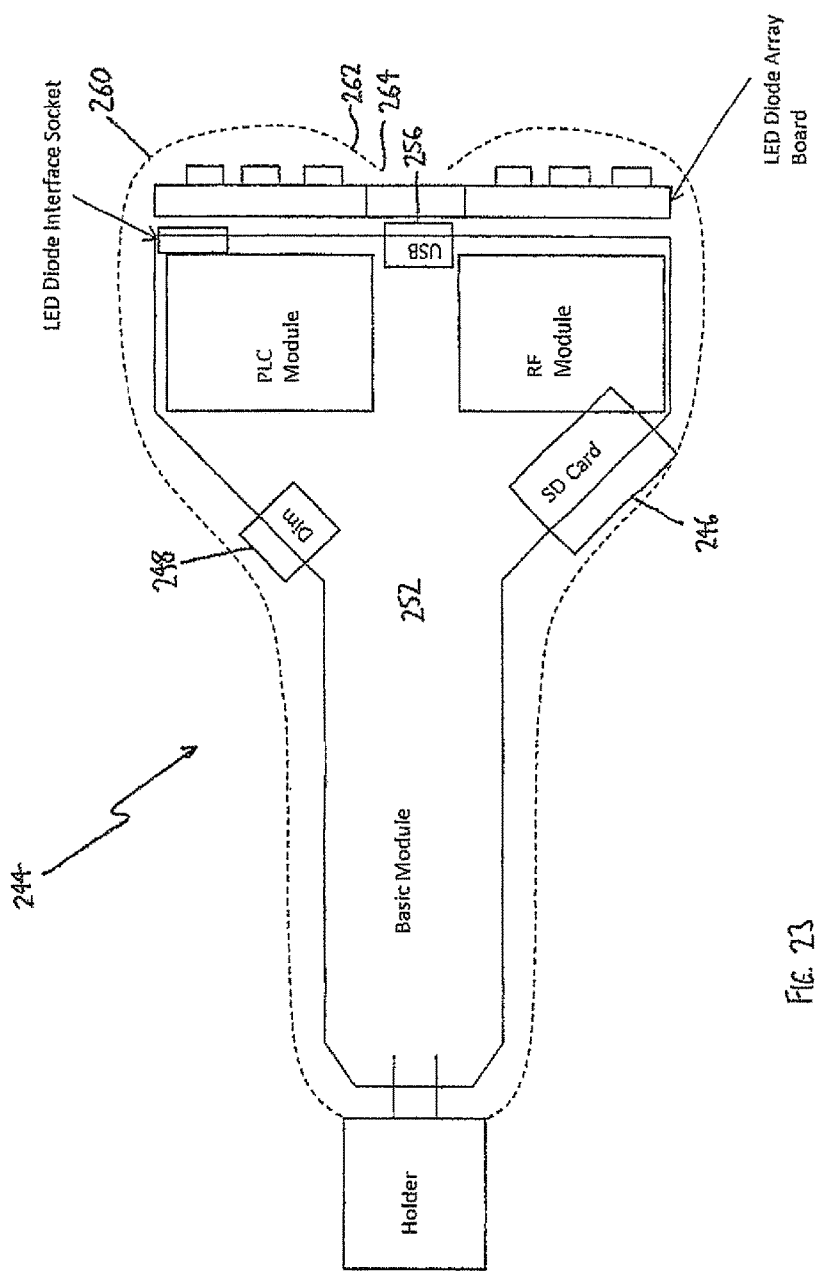
Figure 24:
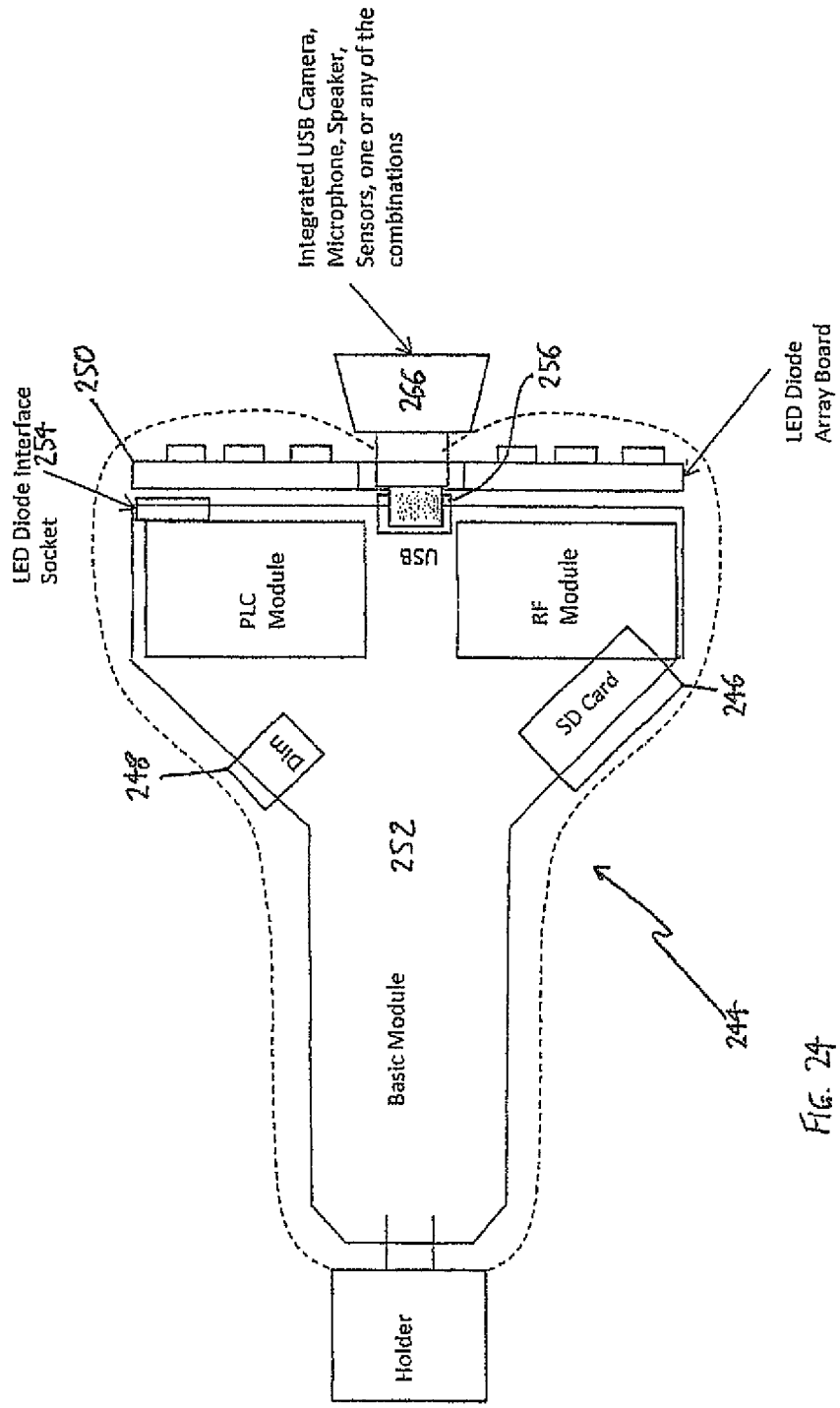

FIGS. 22 to 24 show a light globe communications device 244 including externally accessible device connectors comprising an SD card slot 246 and lighting control port 248. The communications device 244 comprises an LED array 250 connected to a main circuit board 252 by an LED interface socket 254. The communications device 244 differs from the communications device 228 of FIGS. 20 and 21 in that the USB socket or module 256 accessible through an aperture 258 in the LED array 250.

To accommodate the USE socket or module 256 the housing 260 includes a central depression 262 and hole 264 through which the USB socket or module 256 is externally accessible.

The aperture 258 is central on the LED array 250. The aperture 258 thus enables connection of a USB connected device immediately below, and depending from, the communications device 244. Such a USB connected device may be a camera 266 as shown in FIGS. 24 to 27.

Figure 25:
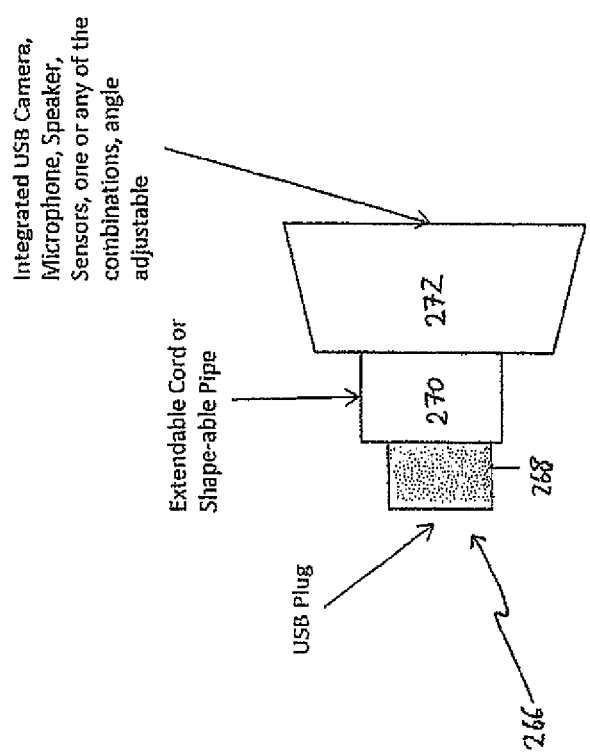
FIGS. 25 to 27 are schematic diagrams of a USB connected digital camera for connection to a communications device in accordance with present teachings.
Figure 26:
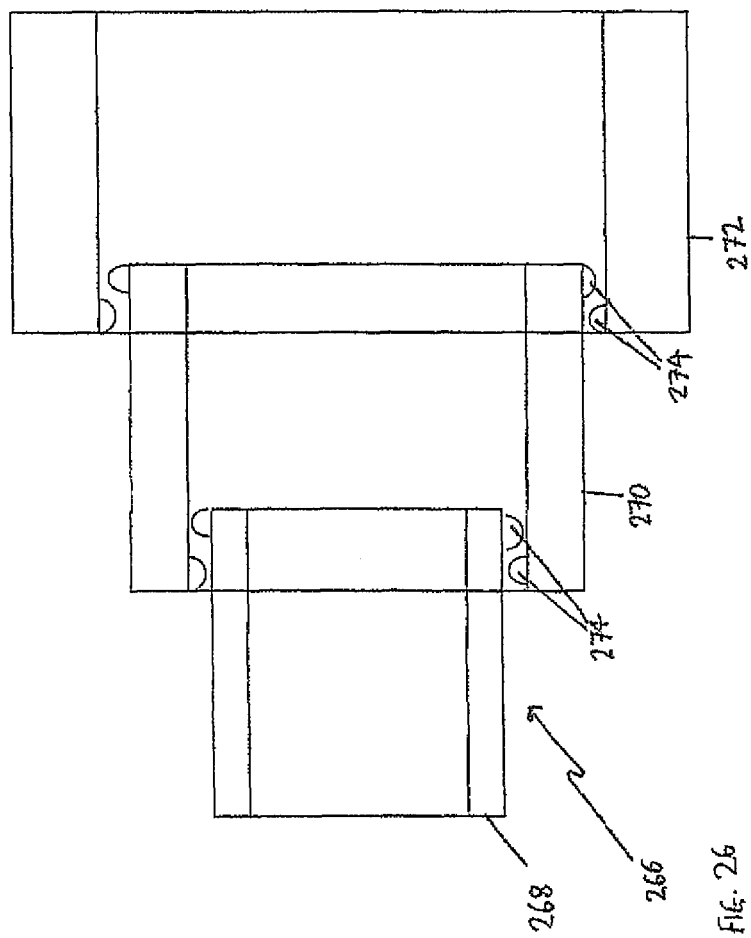
Figure 27:
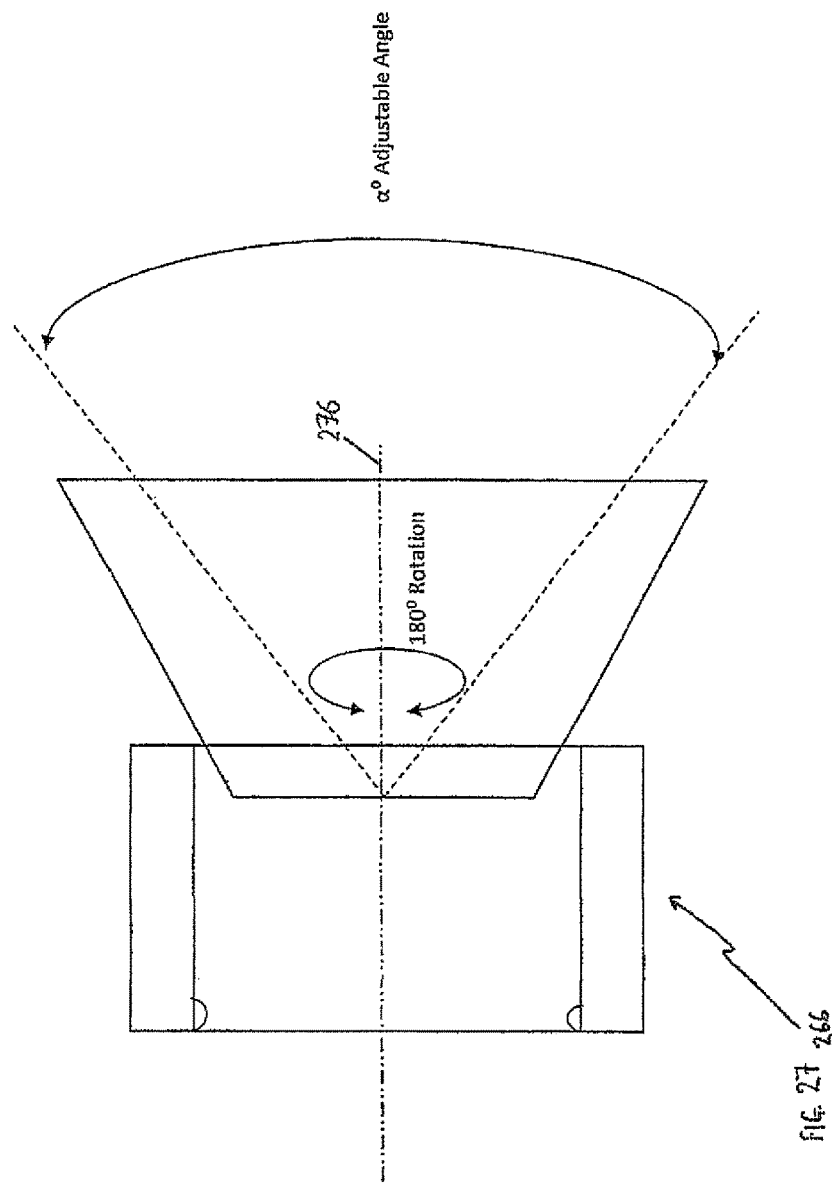

FIGS. 25 to 27 provide examples of a camera 266 capable of motion. In particular, the camera 266 can telescopically extend and retract to change the depth of focus. The camera 266 includes a number of concentric segments 268, 270, 272 that move with respect to each other to telescopically extend and retract the camera 266. As shown in FIG. 26 the segments 269, 270, 272 may include stops 274 preventing over-extension.

In addition to longitudinal movement (e.g. telescopic extension and retraction), the camera 266 is capable of rotation around an axis 276 as indicated by FIG. 27. The camera 266 of the present embodiment can rotate through 1800 as indicated by angle α. The use of servomotors or similar to provide extension, retraction and rotation will depend on the nature of the camera 266 rather than of the communications device per se. The communications device will nevertheless need to provide signals resulting in that motive force.

The signals for controlling the camera 266 may be provided by a person controlling the camera 266—for example, over the Internet or by mobile phone or computer. The signals may alternatively be automatically generated, for example in response to detection of movement in a room. Where the signals are provided by a mobile phone or computer, the mobile phone or computer may employ an APP for controlling software settings of the communications device, control lighting, motion and behaviour of devices integral with or attached to the communications device, and control video streaming from the camera discussed above.

Where the camera does not point directly downward, has a wide field of view, or is rotatable around 2 or more non-parallel axes, the camera may be trained on a particular target and follow that target. If the camera is an infrared camera, the communications device may also provide infrared light from the LED array to invisibly illuminate the room.

Figure 28:
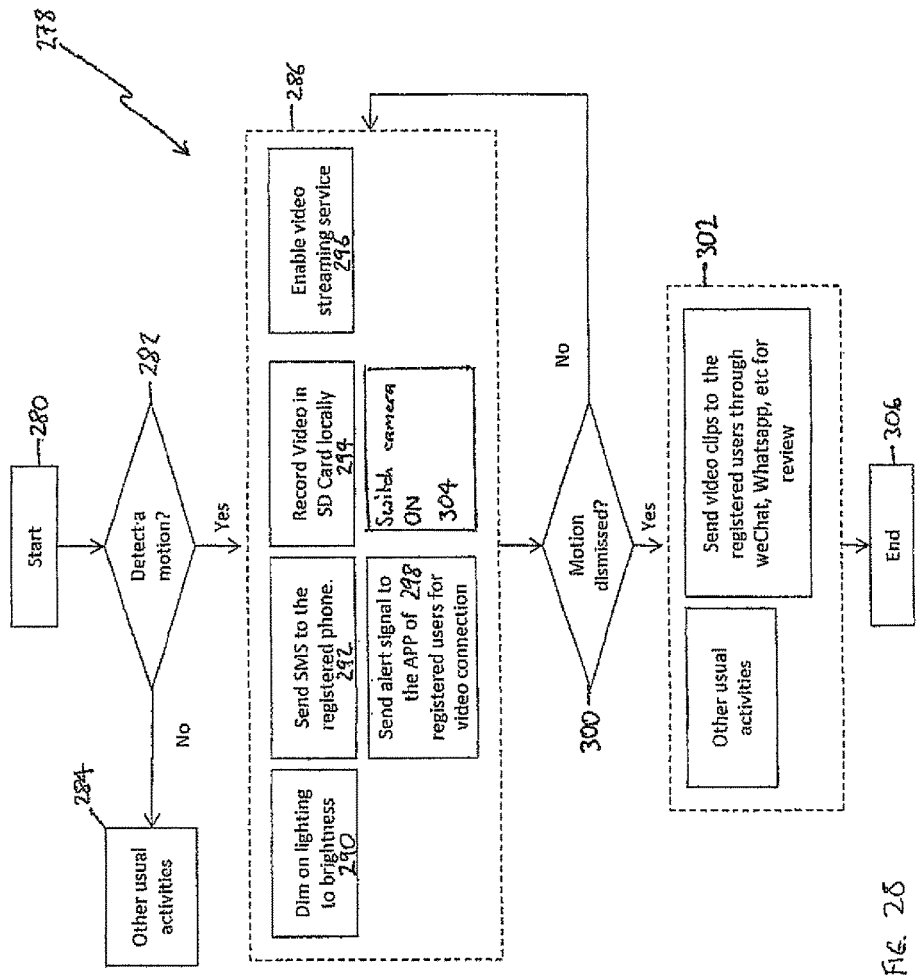
FIG. 28 is a flow chart of a motion detection function using a digital camera attached to a communications device in accordance with present teachings.

FIG. 28 provides an example security program 278 for detecting motion and controlling the operation of the camera 266. The program 278 includes the following steps:

Step 280: the program 278 starts.

Step 282: a check is carried out to determine whether motion has been detected. If no motion has been detected the program terminates at step 284, or cycles back to step 282 after a predetermined delay.

Step 286 (motion detected at step 282): upon detection of motion:
  switch camera on (box 304)
  increase lighting level (box 290)
  send SMS to registered mobile phone to alert the user of the mobile phone to the presence of movement in the area monitored by the camera (box 292)
  generate video feed through the camera and stored that feed in an SD card attached to the communications device (box 294)
  send video stream over the Internet (e.g. to a cloud server) (box 296)
  send alert to a user's app to alert the user to the video stream being available for viewing in real-time (box 298).

Step 300: a check is carried out to determine whether motion has ceased. If motion continues, then step 286 persists although there will likely be no need to resend the SMS or alert, or increase the lighting level again.

Step 302 (motion ceased): video footage is sent or stored as desired, and the system returns to the condition it was in prior to detection motion (e.g. low or no lighting, camera off, etc).

Step 306: the program 278 ends.

Figure 29:
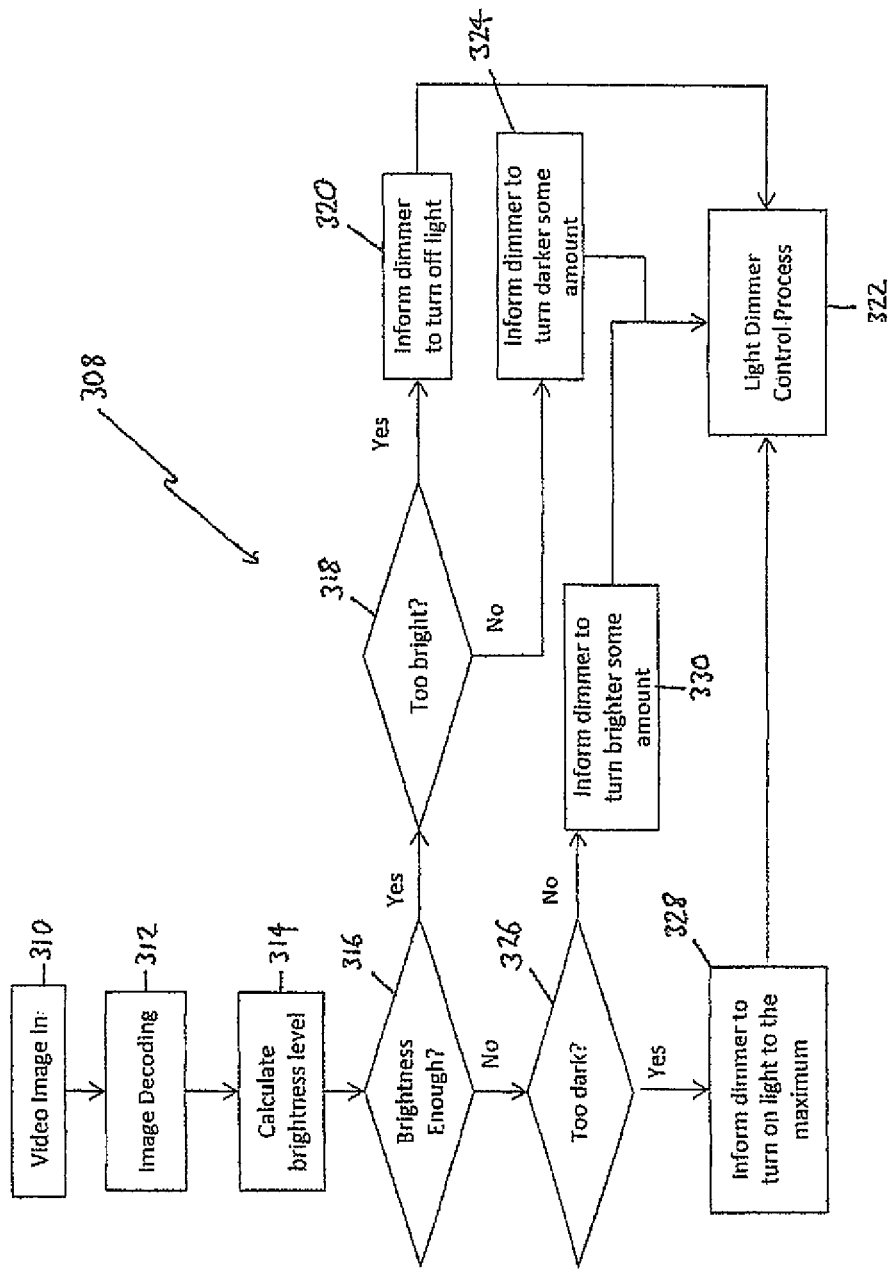
FIG. 29 is a flow chart of a lighting level control function using a digital camera attached to a communications device in accordance with present teachings.

FIG. 29 provides an example lighting level control program 308 employing the camera 266. The program 308 provides the following steps:

Step 310: the camera generates a video feed that is decoded at step 312.

Step 314: the brightness level of light is calculated from the decoded video feed.

Step 316: a check is conducted to determine whether the brightness level is at or in excess of a desired brightness level.

Step 318: a check is conducted to determine whether the brightness level is in excess of a desired brightness level (or range of brightness). If 'Yes', then the lighting is dimmed or turned off (step 32) and the program ends at step 322 (or restarts after a predetermined delay).

If the lighting level determined at step 318 is not too bright the lighting is either maintained at the current level (if at an acceptable brightness or within a range of acceptable brightness) or dimmed by a small amount (step 324) and the program ends at step 322 (or restarts after a predetermined delay).

If the lighting level determined at step 316 is not at or in excess of a desired brightness level, a check is conducted to determine whether the brightness is too dark (step 326). If 'Yes', then the lighting level is increased (step 328) and the program ends at step 322 (or restarts after a predetermined delay).

If the lighting level determined at step 326 is not too dark the lighting is either maintained at the current level (if at an acceptable brightness or within a range of acceptable brightness) or brightened by a small amount (step 330) and the program ends at step 322 (or restarts after a predetermined delay).

The camera 266 may include, or be substituted for, any other appropriate device—for example, a microphone, speaker or a sensor such as a smoke, gas, thermal, noise or light sensor.

The camera, a microphone, speaker or a sensor such as a smoke, gas, thermal, noise or light sensor or any other appropriate device connected through USB socket 102 shown in FIG. 4 or any label in other FIGs can replaced by directed wires without the explicit socket.

Figure 31:
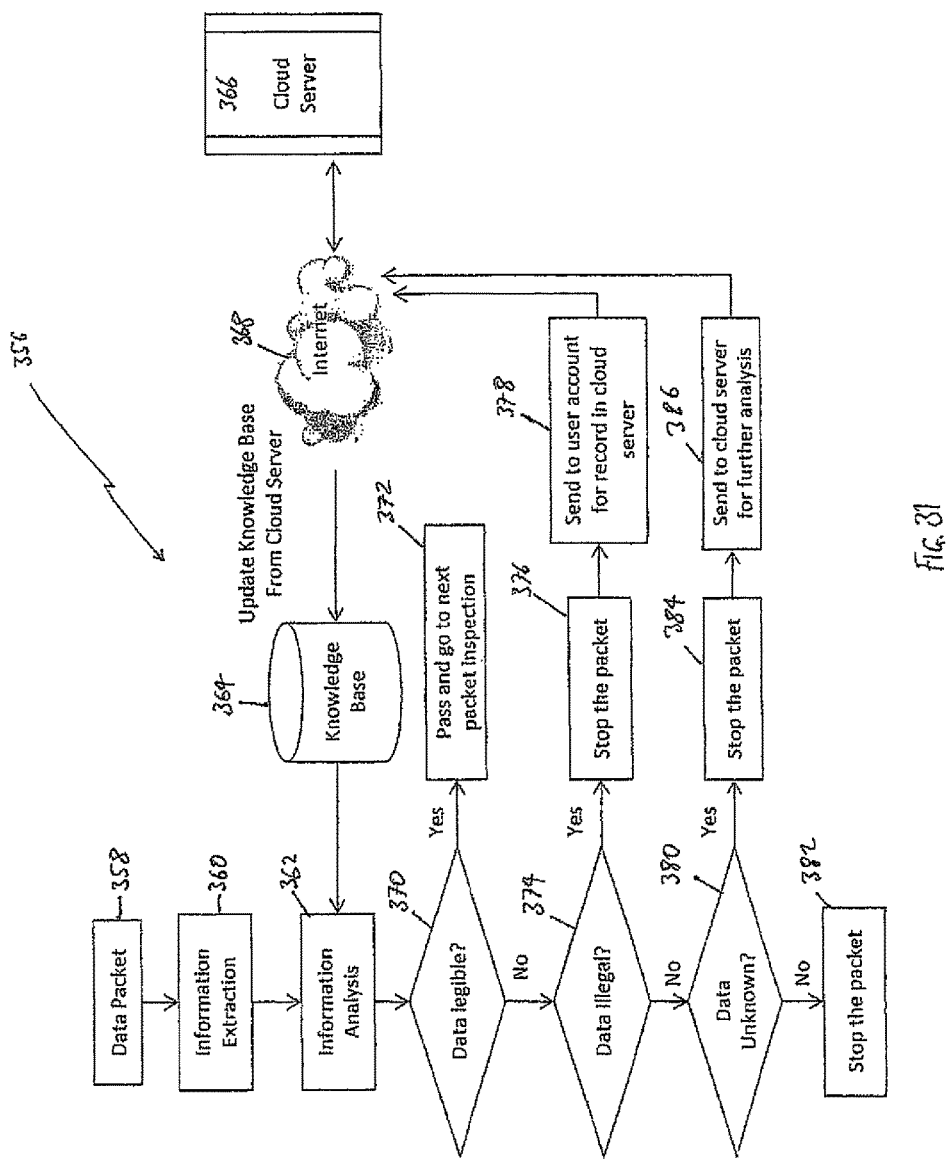
FIG. 31 is a flow chart of a data inspection method performed using a communications device in accordance with present teachings.

The communications devices discussed herein can also perform a security function to maintain a user's privacy. With reference to FIG. 31, the communications device can perform a data inspection process (356) whereby:
  Upon receipt of a data packet (step 358) "useful information"—such as sender/destination address, sender information, etc—is extracted (step 360).
  The "useful information" is analysed (step 362) based on information contained in a knowledge database 364, which knowledge database 364 may be updated by a cloud server 366 over the internet 368.
  If the analysed information is legible (step 370) it passes inspection and inspection moves onto the next data packet (step 372).
  If the analysed information is illegible, a check is conducted to determine whether the data is illegal (step 374).
  If the data is illegal then it is stopped (step 376) and an alert is sent (step 378) to the user's account in the cloud server 366.
  If the data is unknown (step 380) then it stops the packet (steps 382, 384) and in some cases forwards the packet (step 386) to the cloud server 366. The cloud server 366 analyses the unknown data and updates the knowledge base 364 in the device for future use.

Figure 32:
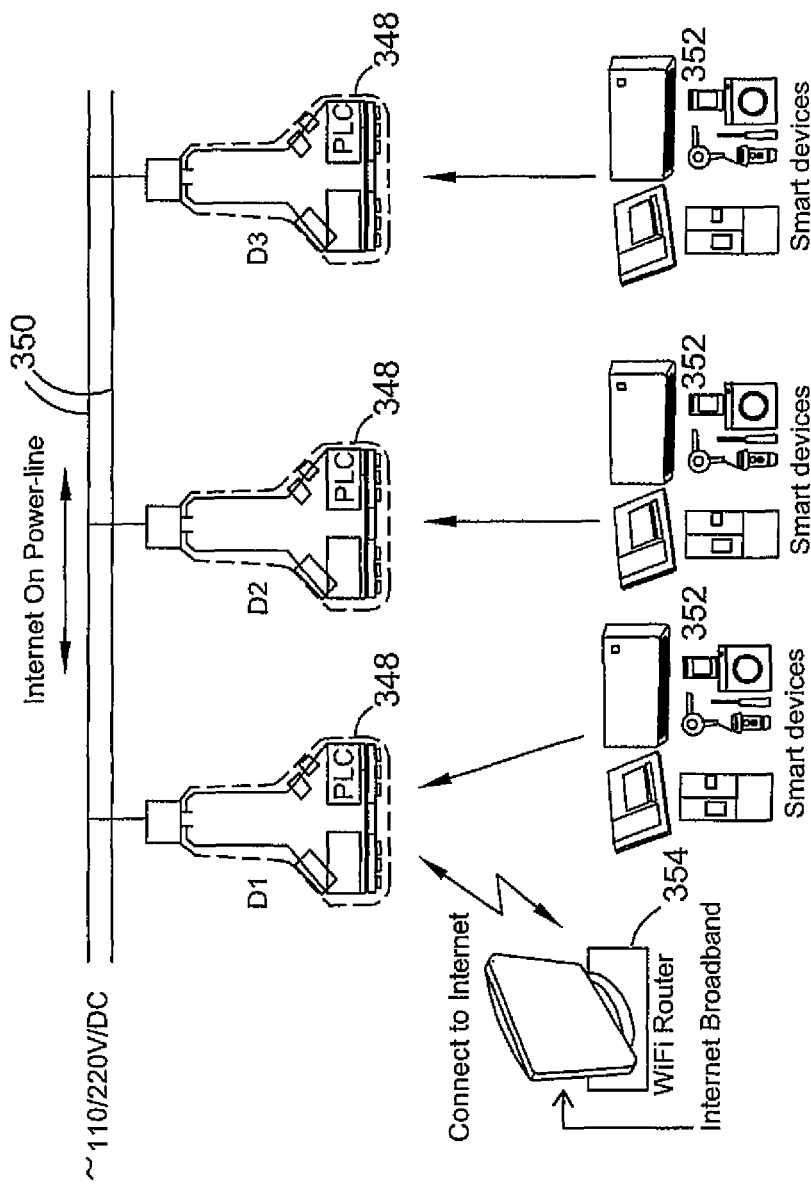
FIG. 32 is a schematic diagram of plural communications devices attached to common mains power lines.

One of the various methods for communications devices of the present disclosure to interact is represented in FIG. 32. A number of communications devices 348 are connected to common mains power lines 350. A single control signal sent along the mains power lines 350 will be received by each of the communications devices 348. The communications devices can therefore be controlled in unison to operate a number of smart devices 352, or to execute a coordinated lighting function without direct interaction between the communications devices 348 (i.e. no "master"/"slave" relationship).

Where there is no PLC router available one of the PLC-enabled communications devices 348 can operate as a PLC router for all PLC enabled devices (e.g. communications devices 348) on the same power circuit. The communications device 348 operating as a PLC router transfers signals between the PLC-enabled devices (including itself) and a non-PLC enabled Wi-Fi router 354. The Wi-Fi router 354 can then connect to services such as the Internet or, for example, a cloud server or other Internet-based facility.

Where the smart devices 352 are (or include) cameras, the position of an article may be supplied on the mains power lines 350 to each communications device 348. Each communications device 348 may have the same response. Alternatively, each communications device 348 may adjust the orientation of their respective camera to independently train that camera onto the article. In this way the cameras can coordinate filming to capture the same article from various angles.

It will be understood that the present teachings afford significant variation in the structure and usage of the present communications devices. All such variations in structure and usage are intended to fall within the scope of the present disclosure.

The invention claimed is:

1. A communications device for forming a network node between at least two devices or systems, comprising:
   a power supply connector comprising a power module, wherein the power module is for connecting to a power supply in a light socket of a lighting system thereby to power the communications device,
   a power line communication (PLC) module connected to the power module, wherein the PLC module is configured to perform data communication over power lines of the power supply; and
   a main module powered by the power module and coupled to the PLC module, wherein the main module is further connected to one or more radio frequency (RF) modules and one or more device connectors, wherein the one or more device connectors are configured to detachably and electrically connect to one or more external modules;
      wherein upon receipt of one or more first data packets from a first device or system over the power lines at the PLC module, the one or more first data packets are transmitted to the main module for redistribution, and wherein the main module is configured to transmit the one or more first data packets to the one or more RF modules for wireless transmission to a second device or system; and,
      wherein upon receipt of one or more second data packets from the second device or system wirelessly received at the one or more RF modules, the one or more second data packets are transmitted to the main module for data redistribution, wherein the main module is configured to transmit the one or more second data packets to the PLC module for transmission over the power lines to the first device or system;
   wherein the communications device depends from the light socket by the power supply connector; and
   wherein the PLC module is coupled with Internet connection over the power lines,
   wherein the communication device further comprises one or more lighting modules that are powered by the power module and connected to the main module, wherein when the one or more first data packets comprises control data for controlling illumination of the one or more lighting modules, the main module is configured to transmit the one or more first data packets to the one or more lighting modules.

2. The communications device of claim 1, wherein when the one or more lighting modules comprise one or more direct current (DC) light sources, the power module is a convertor for converting power from the power supply to DC power for powering the one or more DC light sources, wherein the power supply connector further comprises:
   a detachable zero-detection circuit connected between the converter and the PLC module, the zero-detection circuit being configured to detect current inversion and alerts the PLC module to modulate data transmission rate according to the current inversion that has been detected when the power supply is AC,
   wherein the zero-detection circuit is detached when the power supply is DC.

3. The communications device of claim 1, wherein the one or more device connectors comprises at least one from the group of:
   a USB socket
   a socket comprising a USB interface
   a Secure Digital (SD) card slot
   a cable socket.

4. The communications device of claim 1, wherein the one or more external modules comprises at least one of a motion sensor, light sensor, gas detector, noise detector, thermal detector, smoke alarm, microphone, audio speaker, camera and a Secure Digital (SD) card.

5. The communications device of claim 4, wherein the main module is further configured to receive information from the one or more external modules for redistribution.

6. The communications device of claim 5, wherein when the one or more first data packets comprise an instruction to the camera to commence recording a video feed, the main module is configured to transmit the instruction to the camera for implementation.

7. The communications device of claim 6, wherein the main module is configured to receive the recorded video feed from the camera and transmit the recorded video feed to the first device or system via the PLC module through transmission over the power lines or via the one or more RF modules through wireless transmission.

8. The communications device of claim 7, wherein the main module further comprises a processor that is configured to decode the received image or video and calculate brightness level of the received image or video, whereby the main module is configured to control illumination of the lighting system.

9. The communications device of claim 6, wherein the main module is configured to send a further instruction to the camera to control the camera to cease recording the video feed, when either the transmission of the one or more first data packets has ceased or a further data packet is received from the motion sensor indicating that motion has ceased.

10. The communications device of claim 1, being at least partially housed within a housing, wherein the housing comprises a casing of a lighting tube or lighting globe.

11. The communications device of claim 1, being at least partially housed within a housing, wherein the housing comprises a central depression with a hole through which the one or more device connectors are accessible from outside the housing.

12. The communications device of claim 1, being at least partially housed within a housing, wherein the one or more device connectors are inside the housing.

13. The communications device of claim 1, further comprising a mobile communication card, wherein the main module is configured to receive and transmit information over a mobile phone network.

14. The communications device of claim 1, wherein power-line communication network pairing or reset operations of the PLC module are operated by the main module through a software program from a network.

15. A network of communications devices, each communications device being a communications device for forming a network node between at least two devices or systems, the communications device comprising:
- a power supply connector comprising a power module, wherein the power module is for connecting to a power supply in a light socket of a lighting system thereby to power the communications device,
- a power line communication (PLC) module connected to the power module, wherein the PLC module is configured to perform data communication over power lines of the power supply; and
- a main module powered by the power module and coupled to the PLC module, wherein the main module is further connected to one or more radio frequency (RF) modules and one or more device connectors, wherein the one or more device connectors are configured to detachably and electrically connect to one or more external modules;
    - wherein upon receipt of one or more first data packets from a first device or system over the power lines at the PLC module, the one or more first data packets are transmitted to the main module for redistribution, and wherein the main module is configured to transmit the one or more first data packets to the one or more RF modules for wireless transmission to a second device or system; and,
    - wherein upon receipt of one or more second data packets from the second device or system wirelessly received at the one or more RF modules, the one or more second data packets are transmitted to the main module for data redistribution, wherein the main module is configured to transmit the one or more second data packets to the PLC module for transmission over the power lines to the first device or system;
- wherein the communications device depends from the light socket by the power supply connector; and
- wherein the PLC module is coupled with Internet connection over the power lines,
- wherein the communication device further comprises one or more lighting modules that are powered by the power module and connected to the main module,
- wherein when the one or more first data packets comprises control data for controlling illumination of the one or more lighting modules, the main module is configured to transmit the one or more first data packets to the one or more lighting modules, and wherein the receiver of at least one said communications device receives digital audio data from a first device and sends that audio data to each other said communications device for simultaneous playing of the audio data through speakers of the communications devices.

* * * * *